United States Patent
Kunimi et al.

(10) Patent No.: US 9,976,086 B2
(45) Date of Patent: *May 22, 2018

(54) LIQUID CRYSTAL ALIGNING AGENT CONTAINING POLYIMIDE PRECURSOR HAVING THERMALLY-LEAVING GROUP AND/OR POLYIMIDE

(71) Applicant: NISSAN CHEMICAL INDUSTRIES, LTD., Chiyoda-ku (JP)

(72) Inventors: Naho Kunimi, Funabashi (JP); Naoki Sakumoto, Funabashi (JP); Atsuhiko Mandai, Funabashi (JP)

(73) Assignee: Nissan Chemical Industries, Ltd., Chiyoda-ku (JP)

( * ) Notice: Subject to any disclaimer, the term of this patent is extended or adjusted under 35 U.S.C. 154(b) by 33 days.

This patent is subject to a terminal disclaimer.

(21) Appl. No.: 15/031,547

(22) PCT Filed: Oct. 22, 2014

(86) PCT No.: PCT/JP2014/078139
§ 371 (c)(1),
(2) Date: Apr. 22, 2016

(87) PCT Pub. No.: WO2015/060360
PCT Pub. Date: Apr. 30, 2015

(65) Prior Publication Data
US 2016/0264867 A1 Sep. 15, 2016

(30) Foreign Application Priority Data
Oct. 23, 2013 (JP) .................... 2013-220593

(51) Int. Cl.
| | |
|---|---|
| C08G 73/10 | (2006.01) |
| C09K 19/56 | (2006.01) |
| G02F 1/1337 | (2006.01) |
| C09D 179/08 | (2006.01) |
| C08G 73/02 | (2006.01) |

(52) U.S. Cl.
CPC .......... *C09K 19/56* (2013.01); *C08G 73/0273* (2013.01); *C08G 73/10* (2013.01); *C08G 73/105* (2013.01); *C08G 73/1042* (2013.01); *C08G 73/1071* (2013.01); *C08G 73/1078* (2013.01); *C09D 179/08* (2013.01); *G02F 1/133723* (2013.01)

(58) Field of Classification Search
CPC ..................................... C08G 73/10
See application file for complete search history.

(56) References Cited

FOREIGN PATENT DOCUMENTS

| | | | |
|---|---|---|---|
| JP | 8-76128 A | 3/1996 | |
| JP | 9-138414 A | 5/1997 | |
| JP | 9-297313 A | 11/1997 | |
| JP | 9-316200 A | 12/1997 | |
| JP | 10-104633 A | 4/1998 | |
| JP | 11-38415 A | 2/1999 | |
| JP | 2012193167 A | * 10/2012 | |
| WO | WO 2012/133826 A1 | 10/2012 | |
| WO | WO 2012/133829 A1 | 10/2012 | |
| WO | WO 2012133829 A1 | * 10/2012 | ............. C09K 19/56 |

OTHER PUBLICATIONS

English machine translation of Hori et al. (WO 2012/133829).*
English machine translation of Tamura (JP 2012-193167); generated Jan. 16, 2018.*
International Search Report dated Jan. 6, 2015 in PCT/JP2014/078139.
Masatoshi Kidowaki, et al., "Photocontrolled Liquid Crystal Aligning Films", Functional Materials, Nov. 1997, vol. 17, No. 11, pp. 13-22.

* cited by examiner

*Primary Examiner* — Michael Pepitone
(74) *Attorney, Agent, or Firm* — Oblon, McClelland, Maier & Neustadt, L.L.P.

(57) ABSTRACT

To provide a liquid crystal aligning agent to obtain a liquid crystal alignment film which is excellent in the adhesion to a sealing agent and a substrate of a liquid crystal display device, and of which a decomposed product formed after irradiation with ultraviolet rays will easily be removed.

A liquid crystal aligning agent containing at least one polymer selected from the group consisting of a polyimide precursor having a bond represented by the following formula (1) in its main chain and an imidized polymer of the polyimide precursor:

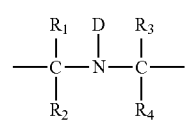

(1)

wherein each of $R_1$, $R_2$, $R_3$ and $R_4$ which are independent of one another, is a hydrogen atom or a $C_{1-20}$ monovalent hydrocarbon group which may have a substituent, and D is a protecting group to be replaced with a hydrogen atom by heat.

13 Claims, No Drawings

LIQUID CRYSTAL ALIGNING AGENT CONTAINING POLYIMIDE PRECURSOR HAVING THERMALLY-LEAVING GROUP AND/OR POLYIMIDE

TECHNICAL FIELD

The present invention relates to a liquid crystal aligning agent containing a polyimide precursor having a protecting group to be replaced with a hydrogen atom by heat (hereinafter sometimes referred to as a thermally-leaving group) and/or a polyimide, and a liquid crystal alignment film obtained from the liquid crystal aligning agent.

BACKGROUND ART

A liquid crystal display device used for a liquid crystal television, a liquid crystal display, etc. usually has a liquid crystal alignment film to control the liquid crystal alignment state provided therein. As the liquid crystal alignment film, a polyimide liquid crystal alignment film obtained by applying a liquid crystal aligning agent containing as the main component a solution of a polyimide precursor such as a polyamic acid (polyamide acid) or a soluble polyimide to a glass substrate or the like and baking it is mainly used. At present, by the industrially most common method, a liquid crystal alignment film is prepared by carrying out so-called rubbing treatment such that the surface of a polyimide liquid crystal alignment film formed on an electrode substrate is rubbed in one direction with a cloth of e.g. cotton, nylon or polyester.

As an alternative to the rubbing treatment, a photo-alignment method of imparting liquid crystal alignment performance by irradiation with polarized ultraviolet rays has been known. As the liquid crystal alignment treatment by the photo-alignment method, in terms of mechanism, one utilizing photoisomerization reaction, one utilizing photocrosslinking reaction, one utilizing photodecomposition reaction, etc. have been proposed (Non-Patent Document 1). Further, in Patent Document 1, use of a polyimide film having an alicyclic structure such as a cyclobutane ring in its main chain for photo-alignment method has been proposed.

Along with a tendency to high precision of a liquid crystal display device, from demands for suppression of a decrease in the contrast of the liquid crystal display device and a reduction of a residual image, for a liquid crystal alignment film, not only development of an excellent liquid crystal alignment property and a stable pretilt angle is required, but also properties such as a high voltage retention, suppression of a residual image which occurs due to alternating-current drive, a low residual charge when a direct-current voltage is applied, and/or quick relaxation of the residual charge accumulated by a direct-current voltage, become more important. For a polyimide liquid crystal alignment film, in order to meet the above demands, various proposals have been made (Patent Documents 2 to 6).

PRIOR ART DOCUMENTS

Patent Documents

Patent Document 1: JP-A-H09-297313
Patent Document 2: JP-A-H09-316200
Patent Document 3: JP-A-H10-104633
Patent Document 4: JP-A-H08-76128
Patent Document 5: JP-A-H09-138414
Patent Document 6: JP-A-H11-38415

Non-Patent Document

Non-Patent Document 1: "Photocontrolled Liquid Crystal Aligning Films" Kidowaki, Ichimura, Functional Materials, November 1997, Vol. 17, No. 11, pp. 13-22

DISCLOSURE OF INVENTION

Technical Problem

In order to broaden the effective pixel area of a liquid crystal display device in recent years, it has been required to further reduce a so-called picture frame area on which pixels are not formed on the peripheral edge portion of a substrate. As the picture frame of a panel is narrowed, a sealing agent for bonding two substrates to prepare a liquid crystal display device is applied on a polyimide liquid crystal alignment film, however, since a polyimide has no polar group, no covalent bond is formed between the sealing agent and the surface of the liquid crystal alignment film, and adhesion of the substrates may be insufficient. Accordingly, an object is to improve the bonding property (adhesion) of the polyimide liquid crystal alignment film to the sealing agent and the substrate.

Further, in the above photo-alignment method, an object is to easily and efficiently remove a decomposed product formed by irradiating the surface of the liquid crystal alignment film with polarized ultraviolet rays.

Solution to Problem

The present inventors have conducted extensive studies, and as a result, found that the above objects are achieved by at least one polymer selected from the group consisting of a polyimide precursor having a specific structure and an imidized polymer of the polyimide precursor, and accomplished the present invention.

1. A liquid crystal aligning agent containing at least one polymer selected from the group consisting of a polyimide precursor having a bond represented by the following formula (1) in its main chain and an imidized polymer of the polyimide precursor:

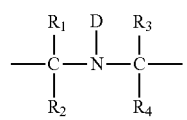

(1)

wherein each of $R_1$, $R_2$, $R_3$ and $R_4$ which are independent of one another, is a hydrogen atom or a $C_{1-20}$ monovalent hydrocarbon group which may have a substituent, and D is a protecting group to be replaced with a hydrogen atom by heat.

2. The liquid crystal aligning agent according to the above 1, wherein the polyimide precursor is a polymer having structural units represented by the following formula (2):

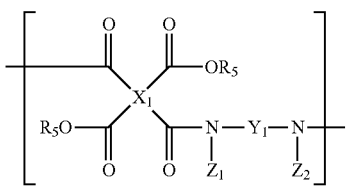

(2)

wherein $X_1$ is a tetravalent organic group, $Y_1$ is a bivalent organic group having a bond represented by the formula (1), $R_5$ is a hydrogen atom or a $C_{1-5}$ alkyl group, and each of $Z_1$ and $Z_2$ which are independent of each other, is a hydrogen atom, or a $C_{1-10}$ alkyl group, $C_{2-10}$ alkenyl group or $C_{2-10}$ alkynyl group which may have a substituent.

3. The liquid crystal aligning agent according to the above 2, wherein the polyimide precursor has the structural units represented by the above formula (2) in an amount of from 20 to 100 mol % based on all the structural units.
4. The liquid crystal aligning agent according to any one of the above 1 to 3, wherein D in the bond represented by the formula (1) is a tert-butoxycarbonyl group or a 9-fluorenylmethoxycarbonyl group.
5. The liquid crystal aligning agent according to any one of the above 2 to 4, wherein $Y_1$ in the structural units of the above formula (2) is a structure represented by the following formula (3):

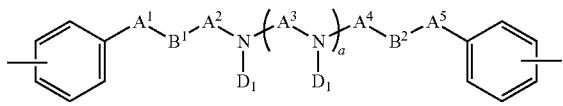

(3)

wherein each of $A^1$ and $A^5$ which are independent of each other, is a single bond or a $C_{1-5}$ alkylene group, each of $A^2$ and $A^4$ which are independent of each other, is a $C_{1-5}$ alkylene group, $A^3$ is a $C_{1-6}$ alkylene group or a cycloalkylene group, each of $B^1$ and $B^2$ which are independent of each other, is a single bond, —O—, —NH—, —NMe-, —C(=O)—, —C(=O)O—, —C(=O)NH—, —C(=O)NMe-, —NHC(=O)— or —N(Me)C(=O)—, $D_1$ is a tert-butoxycarbonyl group or a 9-fluorenylmethoxycarbonyl group, and a is 0 or 1.
6. The liquid crystal aligning agent according to any one of the above 2 to 5, wherein $Y_1$ in the structural units of the above formula (2) is a structure represented by the following formula (4):

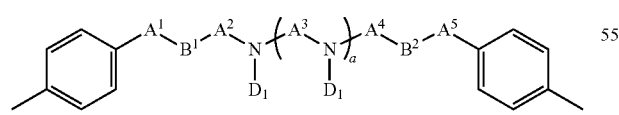

(4)

7. The liquid crystal aligning agent according to the above 5 or 6, wherein $D_1$ in the formula (3) or (4) is a tert-butoxycarbonyl group.
8. The liquid crystal aligning agent according to any one of the above 2 to 7, wherein $Y_1$ in the above formula (2) is at least one bivalent organic group selected from the group consisting of groups of the following formulae (1-1) to (1-4):

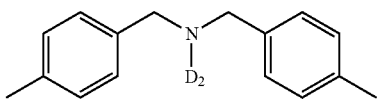

(1-1)

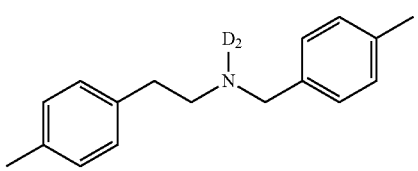

(1-2)

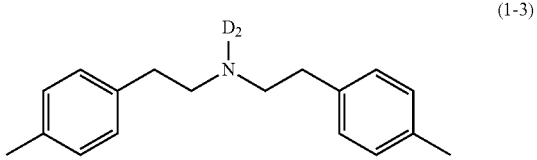

(1-3)

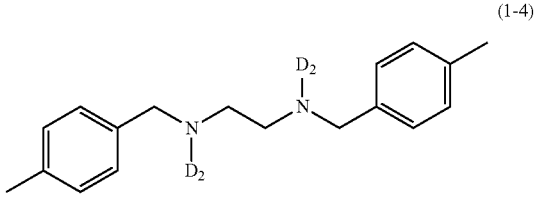

(1-4)

wherein D2 is a tert-butoxycarbonyl group.

9. The liquid crystal aligning agent according to any one of the above 2 to 8, wherein $Y_1$ in the above formula (2) is a bivalent organic group represented by the formula (1-2).
10. The liquid crystal aligning agent according to any one of the above 2 to 9, wherein $X_1$ in the above formula (2) is at least one member selected from the group consisting of structures represented by the following formulae:

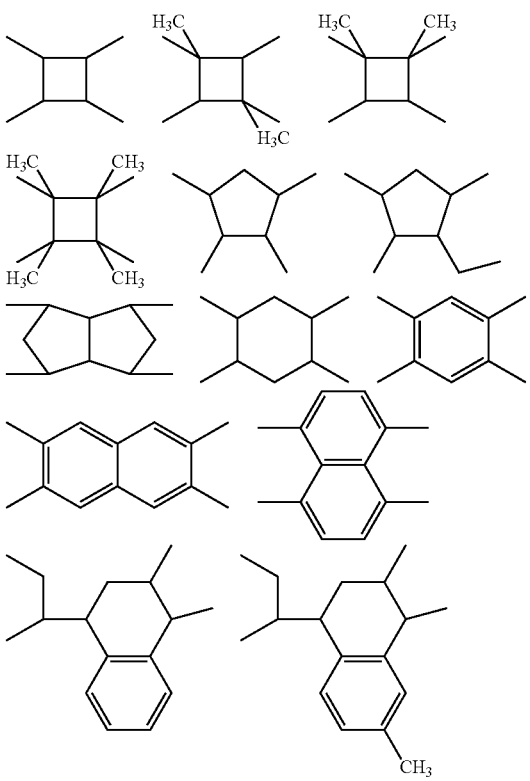

-continued

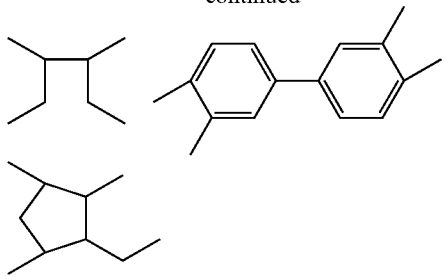

11. A liquid crystal alignment film, obtained by applying and baking the liquid crystal aligning agent as defined in any one of the above 1 to 10.
12. A liquid crystal alignment film obtained by applying the liquid crystal aligning agent as defined in any one of the above 1 to 10, baking it and irradiating it with polarized ultraviolet rays.
13. A liquid crystal display device, having the liquid crystal alignment film as defined in the above 11 or 12.

Advantageous Effects of Invention

According to the liquid crystal aligning agent of the present invention, a liquid crystal alignment film excellent in the adhesion to a sealing agent is obtained. By using such a liquid crystal alignment film, a liquid crystal display device which is excellent in the adhesion between substrates and is resistant to an impact is obtained. The mechanism as to why the adhesion to a sealing agent improves is not necessarily understood clearly, but is considered to be such that the protecting group leaves to form an amino group by heating and as a result, the amino group which is a polar group is exposed to the surface of the liquid crystal alignment film, and by the interaction between the amino group and the functional group in the sealing agent, the adhesion between the liquid crystal alignment film and the sealing agent improves.

Further, when the liquid crystal alignment film of the present invention is used, even when liquid crystal alignment performance is imparted by a photo-alignment method of irradiating the liquid crystal alignment film with polarized radioactive rays, a decomposed product of e.g. a polymer constituting the liquid crystal alignment film, formed by irradiation, can easily and efficiently be removed by an aqueous washing liquid. The mechanism as to why the decomposed product can easily be removed is not necessarily understood clearly, but is considered to be such that the amino group formed by heating improves the solubility of the decomposed product in an aqueous washing liquid.

DESCRIPTION OF EMBODIMENTS

<Liquid Crystal Aligning Agent>

The liquid crystal aligning agent of the present invention contains at least one polymer selected from the group consisting of a polyimide precursor having a bond represented by the following formula (1) in its main chain and an imidized polymer of the polyimide precursor:

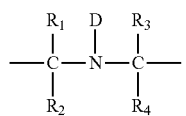

(1)

In the formula (1), each of $R_1$, $R_2$, $R_3$ and $R_4$ which are independent of one another, is a hydrogen atom or a $C_{1-20}$ monovalent hydrocarbon group which may have a substituent. Particularly, since a bulky substituent may lower the liquid crystal alignment property, it is preferably a hydrogen atom, a $C_{1-6}$ alkyl group or a phenyl group, particularly preferably a hydrogen atom or a methyl group.

D is a thermally-leaving group which is a protecting group to be replaced with a hydrogen atom by heat. D is not particularly limited so long as it is a protecting group for an amino group and is a functional group to be replaced with a hydrogen atom by heat. In view of the storage stability of the liquid crystal aligning agent, the protecting group D is preferably a group which does not leave at room temperature, and is a protecting group which leaves by heat preferably at 80° C. or higher, more preferably at 100° C. or higher, particularly preferably at 120° C. or higher. The temperature at which it leaves is preferably at most 250° C., more preferably at most 230° C. Too high a temperature at which it leaves is not preferred since it may lead to decomposition of a polymer. D is preferably a tert-butoxycarbonyl group or a 9-fluorenylmethoxycarbonyl group, in view of the temperature at which it leaves.

The bond represented by above formula (1) is characterized in that the other two connecting bonds of the nitrogen atom to which the thermally-leaving group is bonded have a structure bonded to an aliphatic carbon atom. Such a structure is advantageous in that as compared with a case where one or both of the other two connecting bonds on the nitrogen atom is a carbon atom forming an aromatic ring, the basicity of the amino group formed by heating is high, and thus the reactivity with a functional group in the sealing agent and the solubility of a decomposed product of e.g. a polymer constituting a liquid crystal alignment film formed by irradiation with light tend to be high.

The bivalent organic group having the bond represented by the above formula (1) is particularly preferably one represented by the following formula (3):

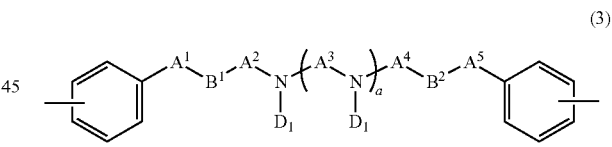

(3)

Especially, the bivalent organic group having the bond represented by the above formula (1) is particularly preferably an organic group represented by the following formula (4), whereby the liquid crystal alignment property of the obtainable liquid crystal alignment film will be high.

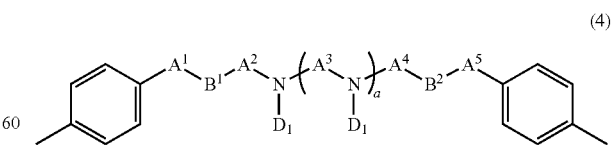

(4)

In the formulae (3) and (4), each of $A^1$ and $A^5$ which are independent of each other, is a single bond or a $C_{1-5}$ alkylene group, and in view of the reactivity with the functional group in the sealing agent, it is preferably a single bond or a methylene group. Each of $A^2$ and $A^4$ which are independent of each other, is a $C_{1-5}$ alkylene group, preferably a methylene group or an ethylene group.

$A^3$ is a $C_{1-6}$ alkylene group or a cycloalkylene group, and in view of the reactivity with the functional group in the sealing agent, preferably a methylene group or an ethylene group.

Each of $B^1$ and $B^2$ which are independent of each other, is a single bond, —O—, —NH—, —NMe-, —C(=O)—, —C(=O)O—, —C(=O)NH—, —C(=O)NMe-, —OC(=O)—, —NHC(=O)— or —N(Me)C(=O)—, and in view of the liquid crystal alignment property of the obtainable liquid crystal alignment film, preferably a single bond or —O—.

$D_1$ is a tert-butoxycarbonyl group or a 9-fluorenylmethoxycarbonyl group, and is preferably a tert-butoxycarbonyl group in view of the temperature at which it leaves.

a is 0 or 1.

In the present invention, the polyimide precursor having a bond represented by the formula (1) in its main chain is preferably a polymer having structural units of the following formula (2):

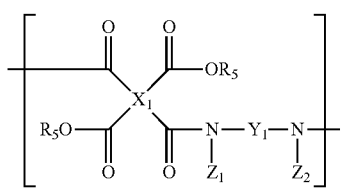
(2)

In the formula (2), $X_1$ is a tetravalent organic group, and each Xi in the formula (2) may be different from one in a different unit, $Y_1$ is a bivalent organic group having a bond represented by the formula (1), and $R_5$ is a hydrogen atom or a $C_{1-5}$ alkyl group. $R_5$ is preferably a hydrogen atom or a methyl group in view of easiness of imidization by heating.

Each of $Z_1$ and $Z_2$ which are independent of each other is a hydrogen atom, or a $C_{1-10}$ alkyl group, $C_{2-10}$ alkenyl group or $C_{2-10}$ alkynyl group which may have a substituent.

The $C_{1-12}$ alkyl group may, for example, be specifically a methyl group, an ethyl group, a propyl group, a butyl group, a t-butyl group, a hexyl group, an octyl group, a decyl group, a cyclopentyl group or a cyclohexyl group. The $C_{2-10}$ alkenyl group may be a group having at least one $CH_2$—$CH_2$ in the above alkyl group replaced with CH=CH. More specifically, it may, for example, be a vinyl group, an allyl group, a 1-propenyl group, an isopropenyl group, a 2-butenyl group, a 1,3-butadienyl group, a 2-pentenyl group, a 2-hexenyl group, a cyclopropenyl group, a cyclopentenyl group or a cyclohexenyl group. The $C_{2-10}$ alkynyl group may be a group having at least one $CH_2$—$CH_2$ in the above alkyl group replaced with C≡C, and more specifically, it may, for example, be an ethynyl group, a 1-propynyl group or a 2-propynyl group.

The $C_{1-10}$ alkyl group, $C_{2-10}$ alkenyl or $C_{2-10}$ alkynyl group may have a substituent so long as it has from 1 to 10, or from 2 to 10 carbon atoms, and further, may form a cyclic structure by a substituent. Forming a cyclic structure by a substituent means that substituents or a substituent and a part of the core skeletal structure are bonded to form a cyclic structure.

Such a substituent may, for example, be a halogen atom, a hydroxy group, a thiol group, a nitro group, an aryl group, an organooxy, an organothio group, an organosilyl group, an acyl group, an ester group, a thioester group, a phosphoric acid ester group, an amido group, an alkyl group, an alkenyl group or an alkynyl group.

If a bulky structure is introduced to the polyimide precursor, usually, the reactivity of the amino group and the liquid crystal alignment property tend to be lowered, and accordingly each of $Z_1$ and $Z_2$ is more preferably a hydrogen atom, or a $C_{1-5}$ alkyl group which may have a substituent, particularly preferably a hydrogen atom, a methyl group or an ethyl group.

$X_1$ is not particularly limited so long as it is a tetravalent organic group. In the polyimide precursor, two or more different types of $X_1$ may be present. As specific examples of $X_1$, structures of the following formulae (X-1) to (X-43) may be mentioned. In view of availability, (X-1) to (X-14) are more preferred.

(X-1)

(X-2)

(X-3)

(X-4)

(X-5)

(X-6)

(X-7)

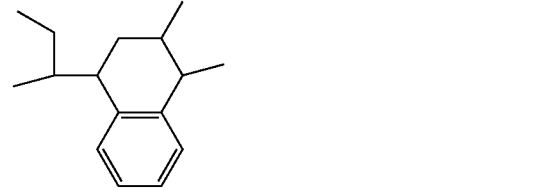
(X-8)

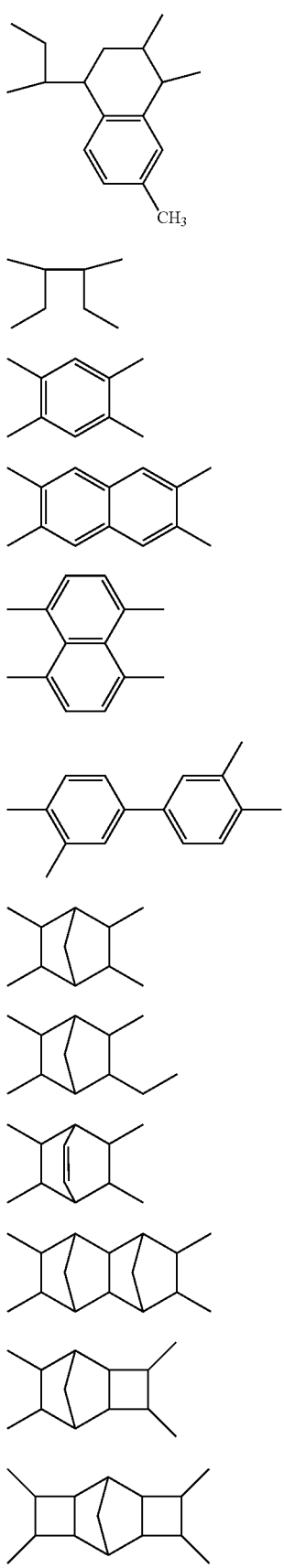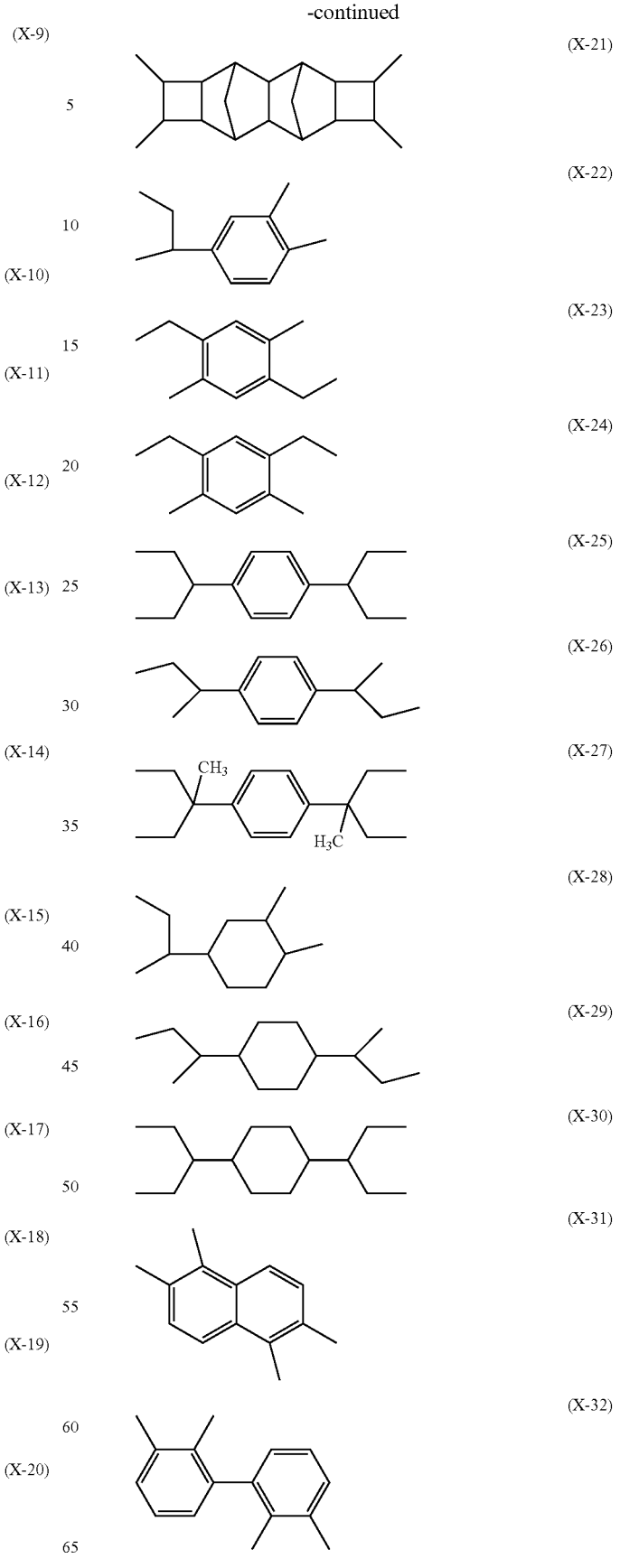

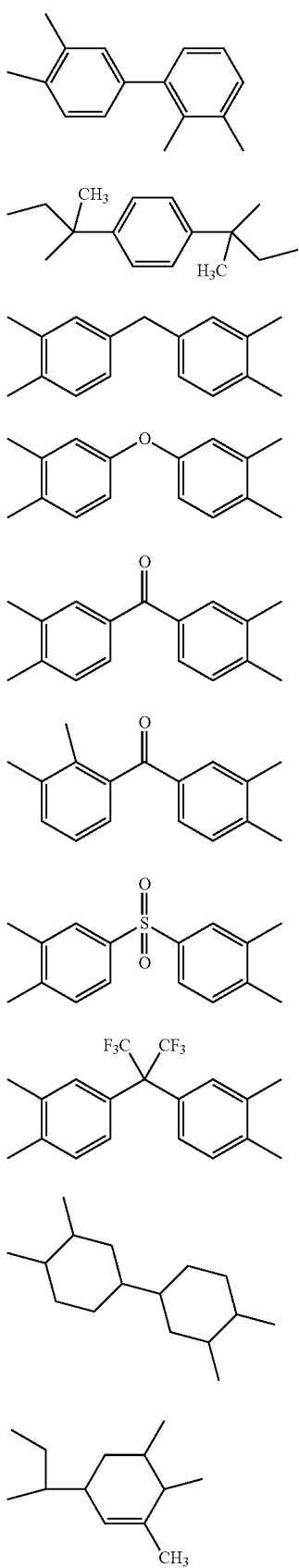

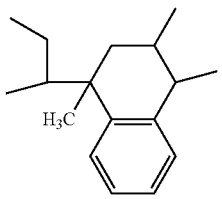

In the above formula (X-1), each of $R_6$ to $R_9$ which are independent of one another, is a hydrogen atom, a halogen atom, a $C_{1-6}$ alkyl group, a $C_{2-6}$ alkenyl group, a $C_{2-6}$ alkynyl group or a phenyl group. If $R_6$ to $R_9$ have a bulky structure, such a structure may lower the liquid crystal alignment property, and accordingly each of them is preferably a hydrogen atom, a methyl group or an ethyl group, particularly preferably a hydrogen atom or a methyl group.

$Y_1$ in the above formula (2) is preferably a structure represented by the formula (3), more preferably a structure represented by the formula (4).

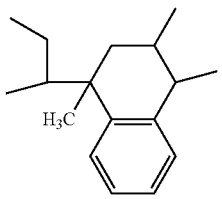

In the above formulae (3) and (4), $A^1$ to $A^5$, $B^1$, $B^2$ and $D^1$ are as defined above.

In the polyimide precursor, two or more different types of $Y_1$ may be present. In order to obtain a favorable liquid crystal alignment property, it is preferred to introduce a highly linear diamine to the polyimide precursor or the polyimide. As specific examples of $Y_1$, the following formulae (1-1) to (1-21) may be mentioned.

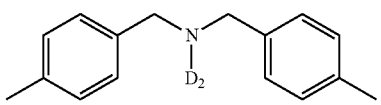

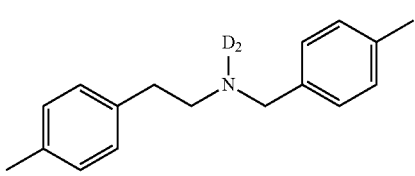

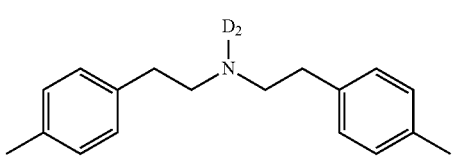

(1-4)
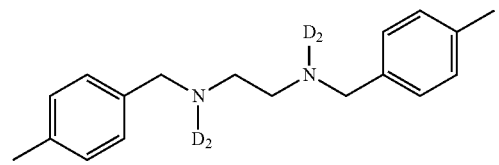

(1-5)
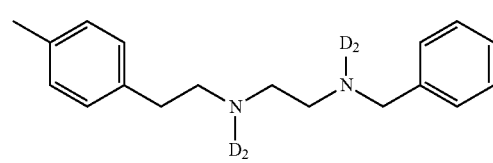

(1-6)
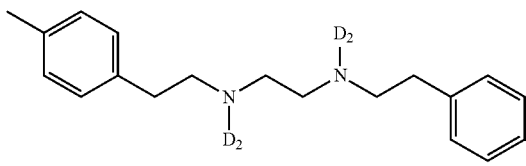

(1-7)
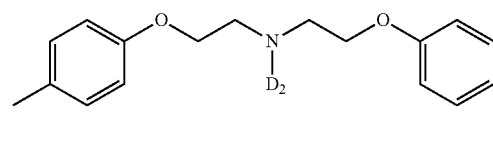

(1-8)
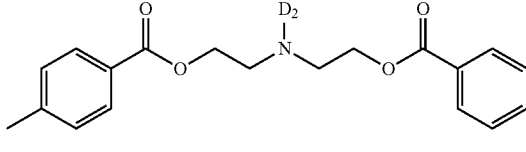

(1-9)
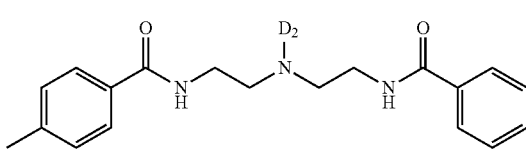

(1-10)
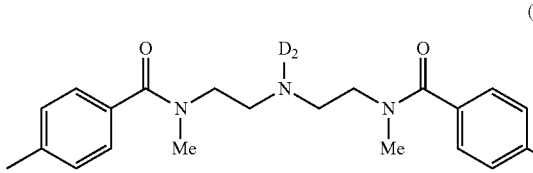

(1-11)
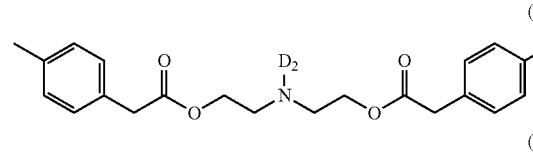

(1-12)
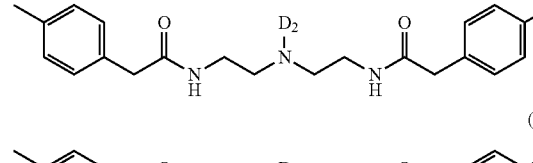

(1-13)
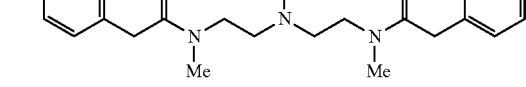

(1-14)
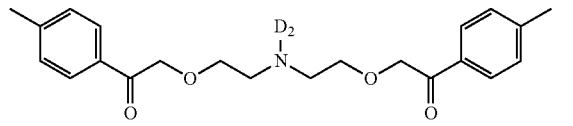

(1-15)
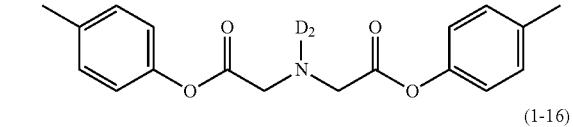

(1-16)
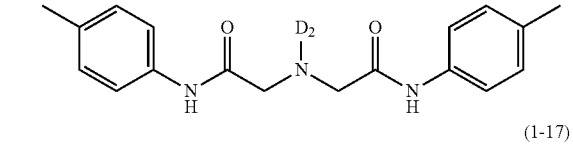

(1-17)
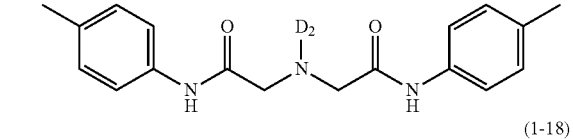

(1-18)
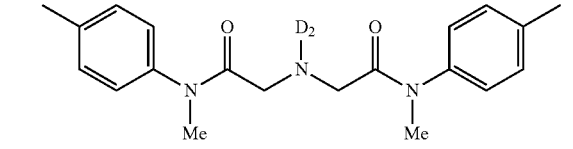

(1-19)
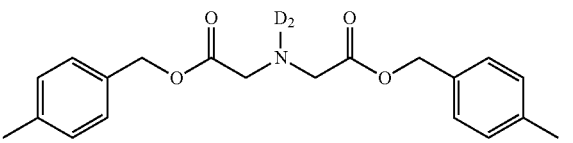

(1-20)
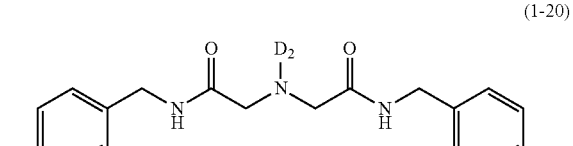

(1-21)
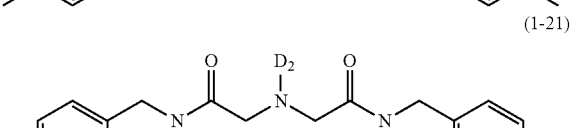

In the formulae (1-1) to (1-21), Me represents a methyl group and $D_2$ represents a tert-butoxycarbonyl group.

Particularly, as specific examples of $Y_1$, more preferred are the formulae (1-1) to (1-4), particularly preferred is the formula (1-2).

In the polyimide precursor having the structural units represented by the above formula (2) and an imidized polymer of the polyimide precursor, the proportion of the structural units represented by the above formula (2) is preferably from 20 to 100 mol %, more preferably from 40 to 100 mol % based on all the structural units in the polymer.

The polyimide precursor and the imidized polymer of the polyimide precursor of the present invention may contain structural units represented by the following formula (5) in addition to the structural units represented by the above formula (2):

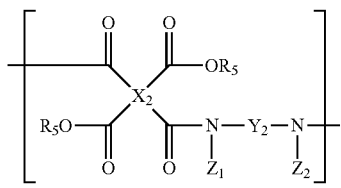
(5)

In the formula (5), $R_5$, $Z_1$ and $Z_2$ are as defined for the above formula (2).

In the formula (5), $X_2$ is a tetravalent organic group, and its definition is the same as that of $X_1$ in the formula (2) including preferred examples.

In the formula (5), $Y_2$ is a bivalent organic group, and its structure is not particularly limited. As specific examples of $Y_2$, the following formulae (Y-1) to (Y-114) may be mentioned. Further, two or more types of the structural units represented by the formula (5) may be contained.

Particularly, in order to obtain a favorable liquid crystal alignment property, it is preferred to use a diamine which forms a highly linear polyimide. Accordingly, in view of the liquid crystal alignment property, $Y_2$ is preferably Y-7, Y-10, Y-11, Y-12, Y-13, Y-21, Y-22, Y-23, Y-25, Y-26, Y-27, Y-41, Y-42, Y-43, Y-44, Y-45, Y-46, Y-48, Y-61, Y-63, Y-64, Y-71, Y-72, Y-73, Y-74, Y-75 or Y-98. The proportion of a diamine having the above $Y_2$ is preferably from 40 to 100 mol %, more preferably from 60 to 100 mol % based on all the diamines represented by the formula (5).

Further, in a case where the pretilt angle is to be high, it is preferred to use a diamine having on its side chains a long chain alkyl group, an aromatic ring, an aliphatic ring, a steroid skeleton or a combination thereof. Accordingly, in view of the pretilt angle, $Y_2$ is preferably Y-76, Y-77, Y-78, Y-79, Y-80, Y-81, Y-82, Y-83, Y-84, Y-85, Y-86, Y-87, Y-88, Y-89, Y-90, Y-91, Y-92, Y-93, Y-94, Y-95, Y-96 or Y-97. By adding a diamine having such $Y_2$ in an amount of from 1 to 50 mol %, more preferably from 5 to 20 mol % based on all the diamines represented by the formula (5), an optional pretilt angle will be developed.

(Y-1)
(Y-2)
(Y-3)
(Y-4)

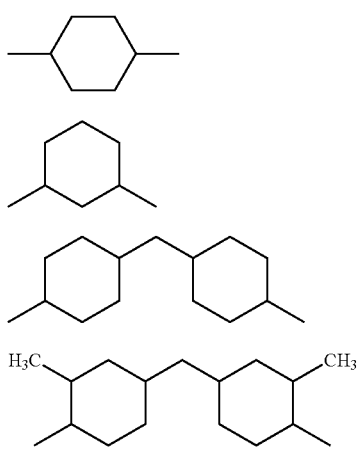

(Y-5)
(Y-6)
(Y-7)
(Y-8)
(Y-9)
(Y-10)
(Y-11)
(Y-12)
(Y-13)
(Y-14)
(Y-15)

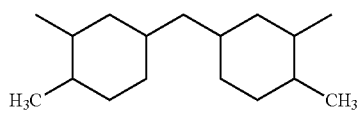
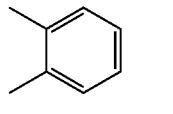
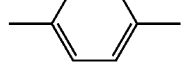
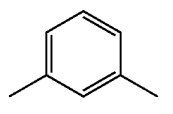
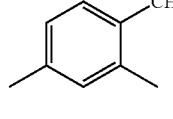
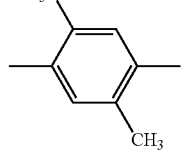
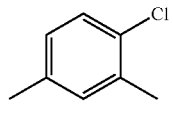
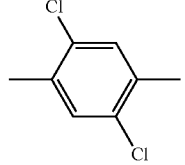
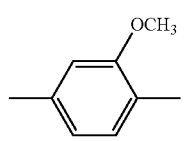
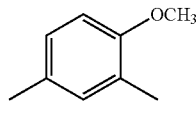
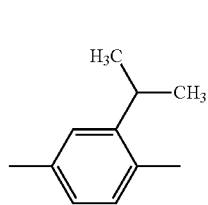

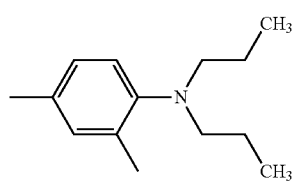
(Y-16)
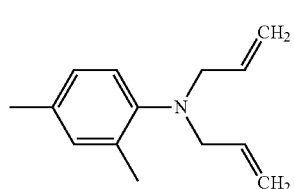
(Y-17)
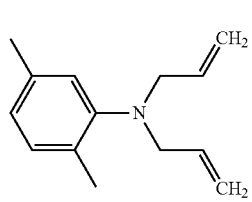
(Y-18)
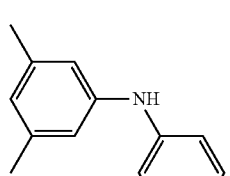
(Y-19)
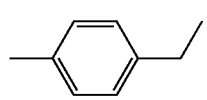
(Y-20)
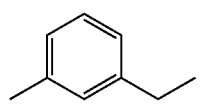
(Y-21)
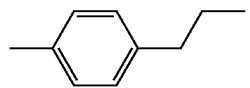
(Y-22)
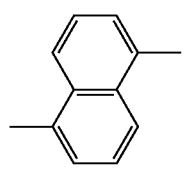
(Y-23)
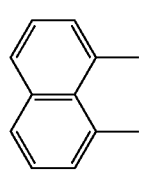
(Y-24)
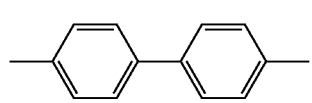
(Y-25)

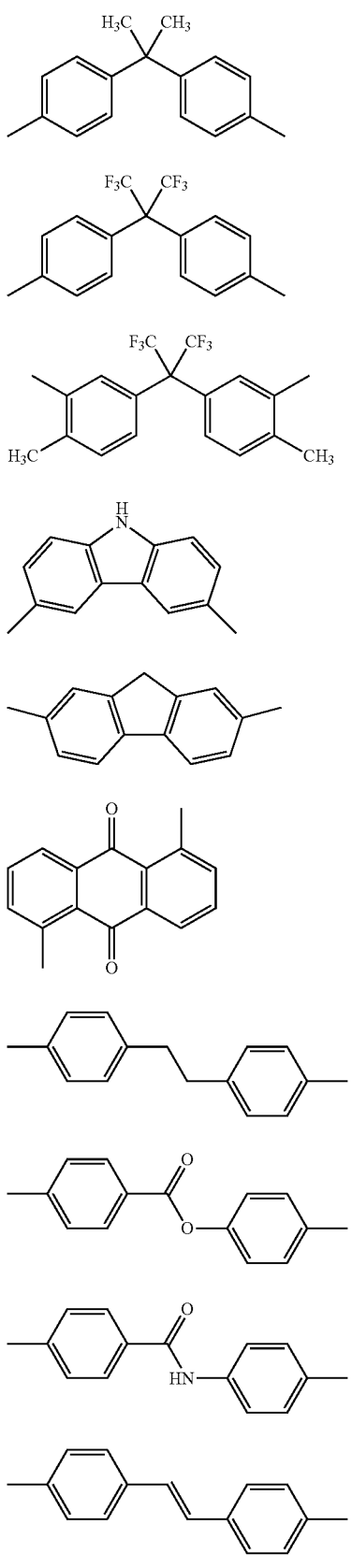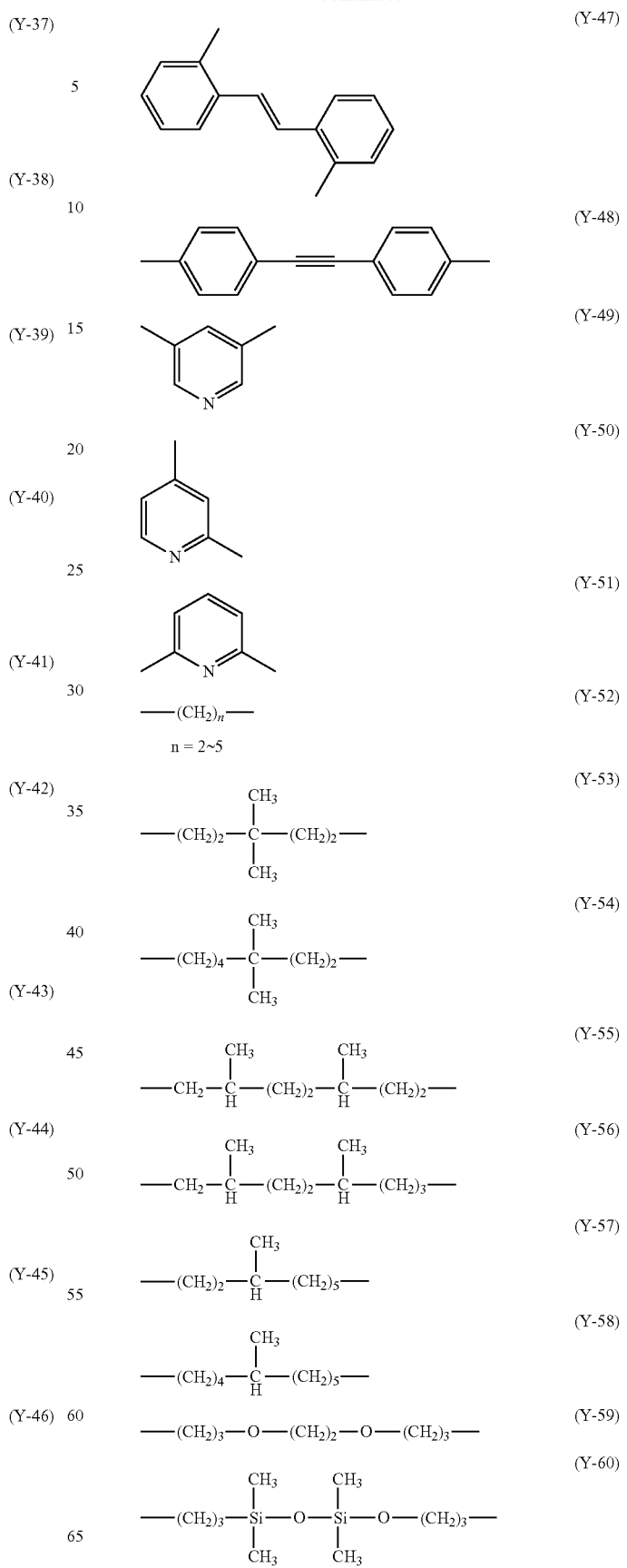

(Y-61)
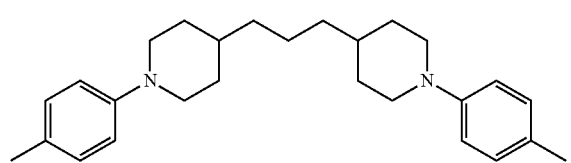
(Y-62)
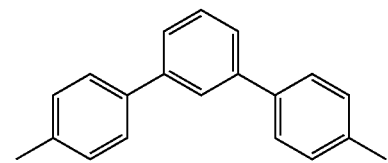
(Y-63)
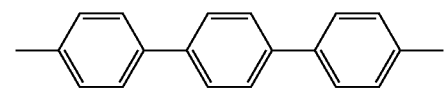
(Y-64)
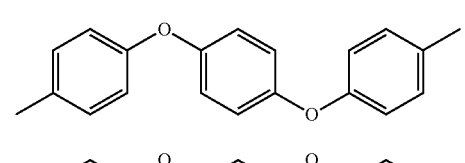
(Y-65)
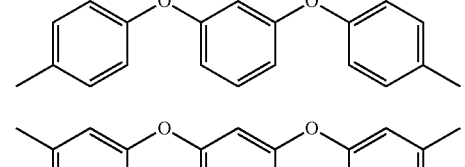
(Y-66)
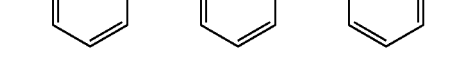
(Y-67)
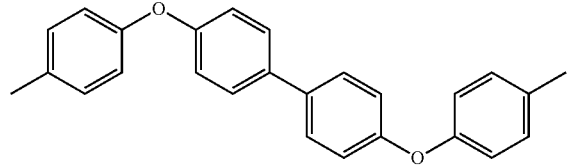
(Y-68)
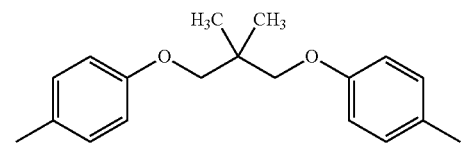
(Y-69)
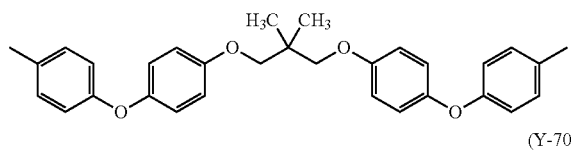
(Y-70)
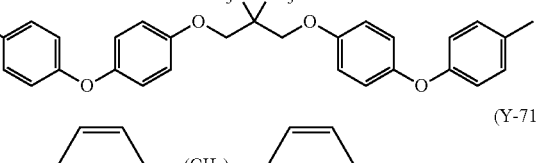
(Y-71)
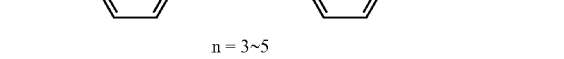
n = 3~5
(Y-72)
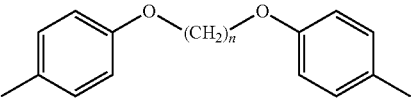
n = 2~5
(Y-73)
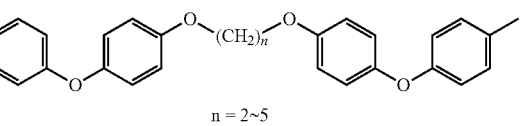
n = 2~5
(Y-74)
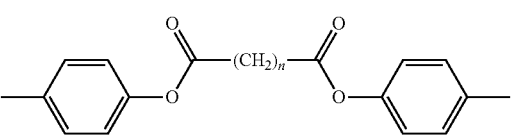
n = 2~5
(Y-75)
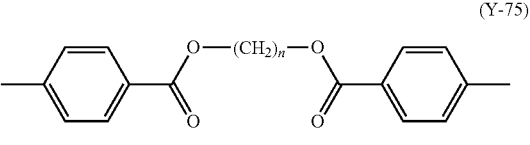
n = 2~5
(Y-76)
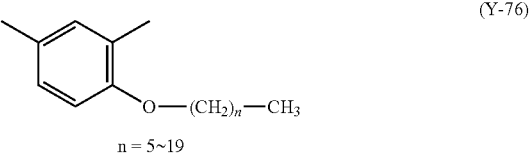
n = 5~19
(Y-77)
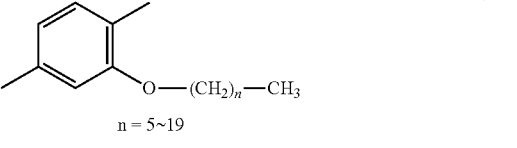
n = 5~19
(Y-78)
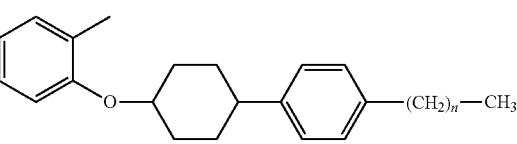
n = 0~21
(Y-79)
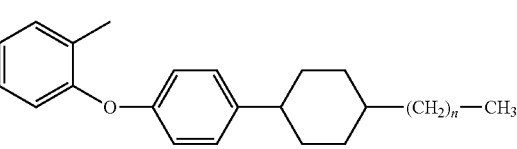
n = 0~21
(Y-80)
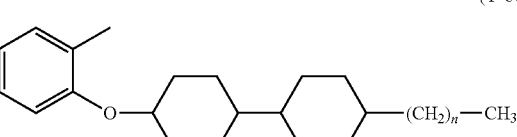
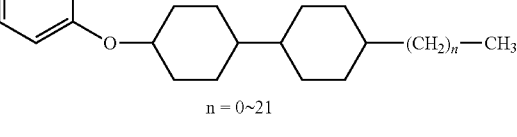
n = 0~21

(Y-81)
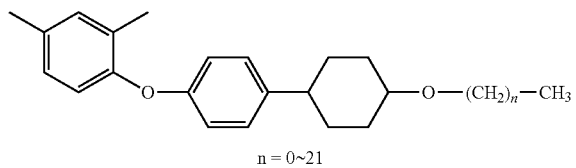
n = 0~21
(Y-82)
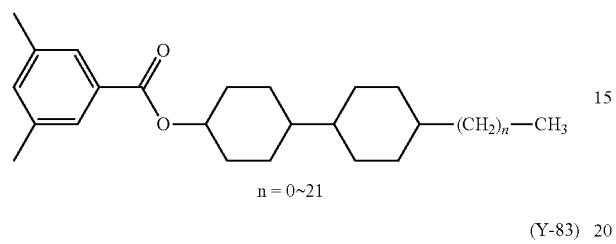
n = 0~21
(Y-83)
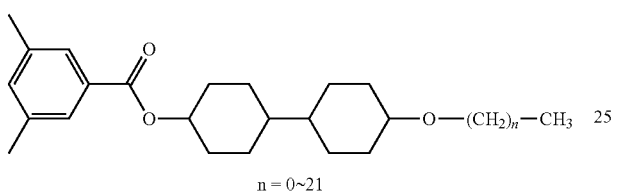
n = 0~21
(Y-84)
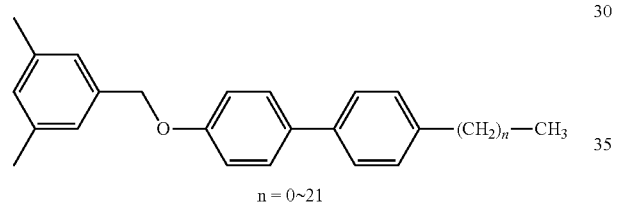
n = 0~21
(Y-85)
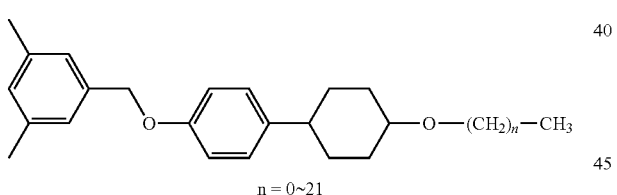
n = 0~21
(Y-86)
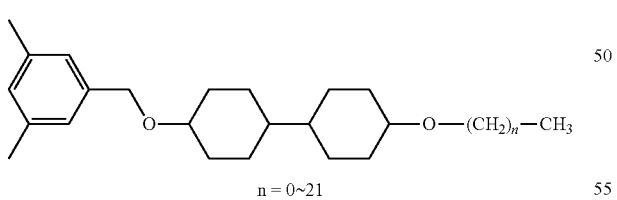
n = 0~21
(Y-87)
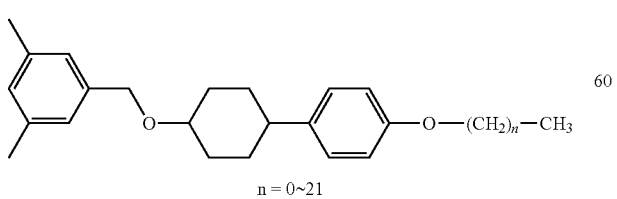
n = 0~21
(Y-88)
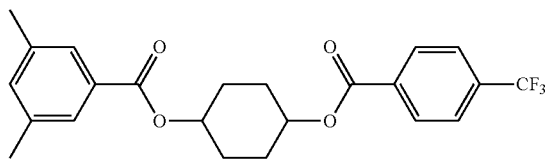
(Y-89)
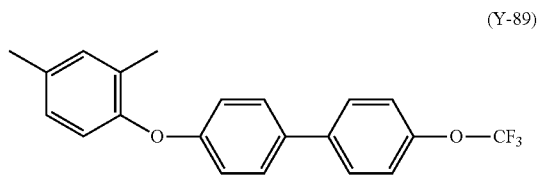
(Y-94)
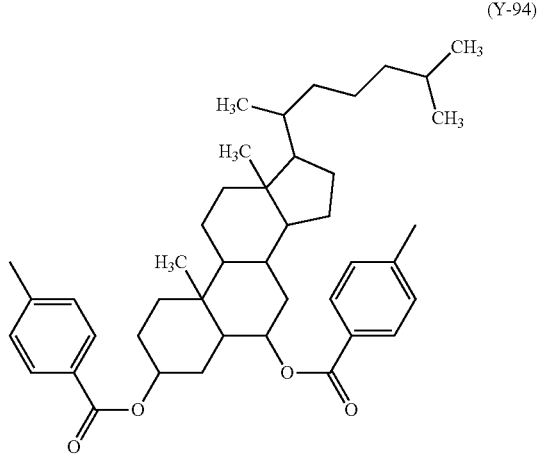
(Y-95)
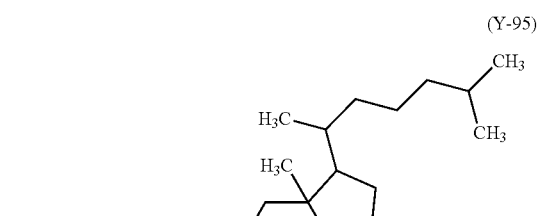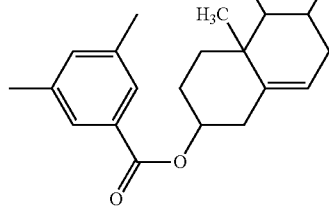

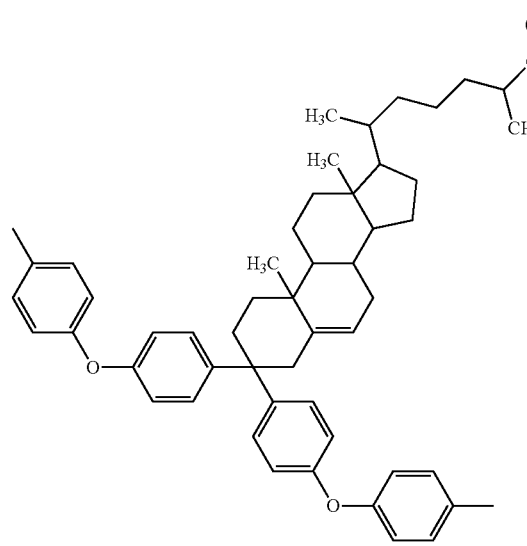
(Y-96)
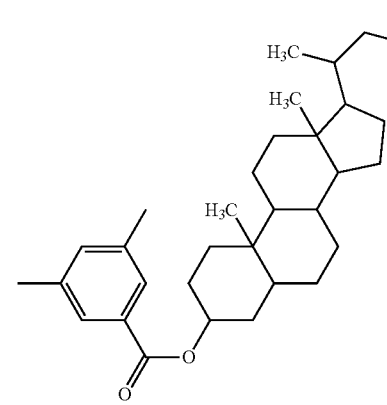
(Y-97)
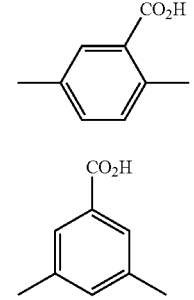
(Y-98)
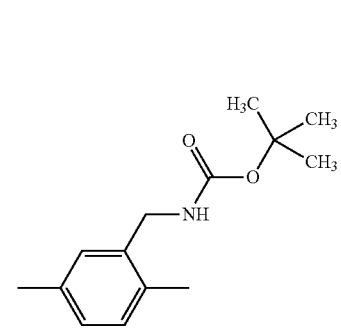
(Y-99)
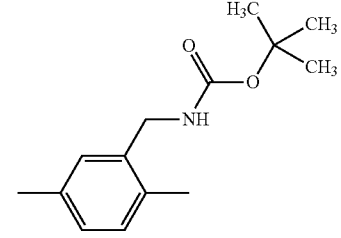
(Y-100)
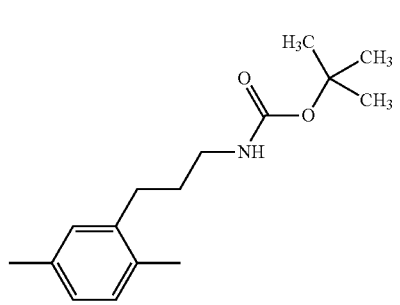
(Y-101)
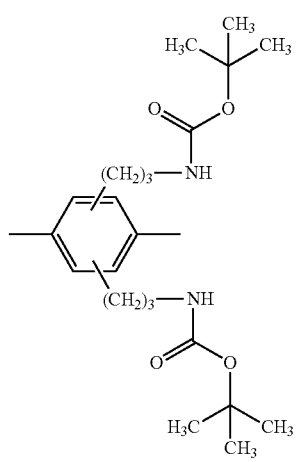
(Y-102)
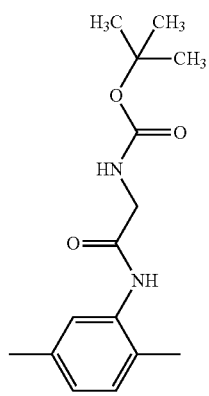
(Y-103)
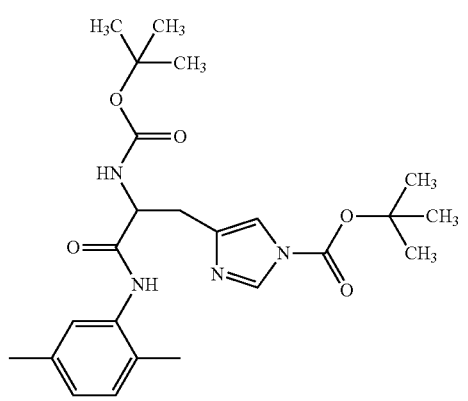
(Y-104)

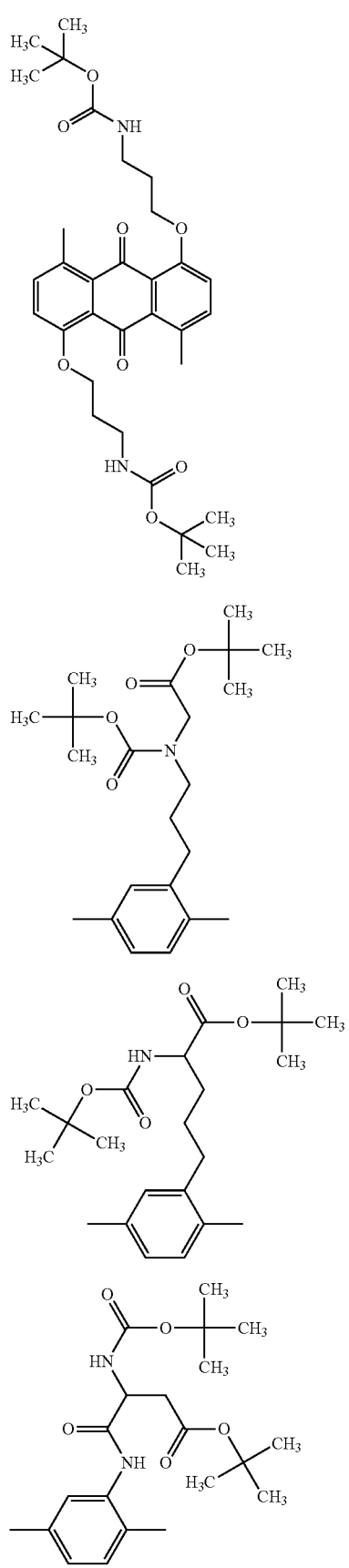

<Production of Polyimide Precursor: Polyamic Acid>

A polyamic acid which is a polyimide precursor to be used in the present invention is produced by the following method.

It is produced by subjecting tetracarboxylic acid to form $X_1$ in the structural units of the above formula (2) or its dianhydride and a diamine having $Y_1$, to polycondensation in the presence of an organic solvent at from −20° C. to 150° C., preferably from 0° C. to 50° C. for from 30 minutes to 24 hours, preferably from 1 to 12 hours.

The reaction of the diamine component and the tetracarboxylic acid component is usually carried out in an organic solvent. The organic solvent to be used is not particularly limited so long as the formed polyimide precursor is soluble in it. Specific examples of the organic solvent to be used for the reaction are mentioned below, however, it is not limited to such specific examples. For example, N-methyl-2-pyrrolidone, N-ethyl-2-pyrrolidone or γ-butyrolactone, N,N-dimethylformamide, N,N-dimethylacetamide, dimethyl sulfoxide or 1,3-dimethyl-imidazolidinone may be mentioned.

Further, in a case where the solubility of the polyimide precursor is high, methyl ethyl ketone, cyclohexanone, cyclopentanone, 4-hydroxy-4-methyl-2-pentanone or an organic solvent represented by any of the following formulae [D-1] to [D-3] may be used.

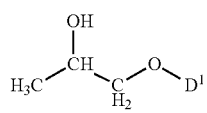
[D-1]

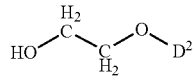
[D-2]

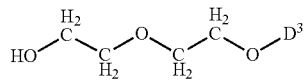
[D-3]

In the formula [D-1], $D^1$ represents a $C_{1-3}$ alkyl group, in the formula [D-2], $D^2$ represents a $C_{1-3}$ alkyl group, and in the formula [D-3], $D^3$ represents a $C_{1-4}$ alkyl group.

Such solvents may be used alone or as mixed. Further, even a solvent in which the polyimide precursor is not soluble may be used as mixed with the above solvent within a range where the formed polyimide precursor will not precipitate. Further, moisture in the solvent will inhibit the polymerization reaction and further may cause hydrolysis of the formed polyimide precursor, and accordingly, the solvent is preferably dehydrated.

The concentration of the polyamic acid polymer in the reaction system is preferably from 1 to 30 mass %, more preferably from 5 to 20 mass %, whereby precipitation of the polymer is less likely to occur, and a high molecular weight product tends to be obtained.

By pouring the reaction solution of the polyamic acid obtained as mentioned above into a poor solvent with well stirring, the polymer can be precipitated and recovered. Further, a purified powder of the polyamic acid can be obtained by carrying out precipitation several times, and washing the precipitates with a poor solvent and drying them at room temperature or by heating. The poor solvent is not particularly limited and may, for example, be water, methanol, ethanol, hexane, butyl cellosolve, acetone or toluene.

<Production of Polyimide Precursor: Polyamic Acid Ester>

A polyamic acid ester which is a polyimide precursor to be used in the present invention may be produced by the following process (1), (2) or (3).

(1) Production From Polyamic Acid

The polyamic acid ester may be produced by esterifying the above-produced polyamic acid. Specifically, it may be produced by reacting the polyamic acid and an esterifying agent in the presence of an organic solvent at from −2 ° C. to 15 ° C., preferably from 0° C. to 50° C. for from 30 minutes to 24 hours, preferably from 1 to 4 hours.

The esterifying agent is preferably one which can readily be removed by purification, and may, for example, be N,N-dimethylformamide dimethyl acetal, N,N-dimethylformamide diethyl acetal, N,N-dimethylformamide dipropyl acetal, N,N-dimethylformamide dineopentylbutyl acetal, N,N-dimethylformamide di-t-butyl acetal, 1-methyl-3-p-tolyltriazene, 1-ethyl-3-p-tolyltriazene, 1-propyl-3-p-tolyl-triazene or 4-(4,6-dimethoxy-1,3,5-triazin-2-yl)-4-methyl-morpholinium chloride. The amount of the esterifying agent is preferably from 2 to 6 molar equivalent per 1 mole of the repeating units of the polyamic acid.

The organic solvent may, for example, be N-methyl-2-pyrrolidone, N-ethyl-2-pyrrolidone or γ-butyrolactone, N,N-dimethylformamide, N,N-dimethylacetamide, dimethyl sulfoxide or 1,3-dimethyl-imidazolidinone. Further, in a case where the solubility of the polyimide precursor in a solvent is high, methyl ethyl ketone, cyclohexanone, cyclopentanone, 4-hydroxy-4-methyl-2-pentanone or a solvent represented by any of the above formulae [D-1] to [D-3] may be used.

Such solvents may be used alone or as mixed. Further, even a solvent in which the polyimide precursor is not soluble may be used as mixed with the above solvent within a range where the formed polyimide precursor will not precipitate. Further, moisture in the solvent will inhibit the polymerization reaction and further may cause hydrolysis of the formed polyimide precursor, and accordingly, the solvent is preferably dehydrated.

The solvent to be used for the above reaction is preferably N,N-dimethylformamide, N-methyl-2-pyrrolidone or γ-butyrolactone in view of the solubility of the polymer, and they may be used alone or as a mixture of two or more. The concentration at the time of production is preferably from 1 to 30 mass %, more preferably from 5 to 20 mass %, whereby precipitation of the polymer is less likely to occur, and a high molecular weight product tends to be obtained.

(2) Production by Reaction of Tetracarboxylic Acid Diester Dichloride and Diamine The polyamic acid ester may be produced from tetracarboxylic acid diester dichloride and a diamine.

Specifically, the polyamic acid ester may be produced by reacting tetracarboxylic acid diester dichloride and a diamine in the presence of a base and an organic solvent at from −20 to 150° C., preferably from 0 to 50° C. for from 30 minutes to 24 hours, preferably from 1 to 4 hours.

As the base, pyridine, triethylamine, 4-dimethylaminopyridine or the like may be used, and pyridine is preferred, whereby the reaction will moderately proceed. The amount of the base is preferably from 2 to 4 molar times based on tetracarboxylic acid diester dichloride, whereby the base will easily be removed, and a high molecular weight product tends to be obtained.

The solvent to be used for the above reaction is preferably N-methyl-2-pyrrolidone or γ-butyrolactone in view of the solubility of the monomer and the polymer, and they may be used alone or as a mixture of two or more. The polymer concentration at the time of production is preferably from 1 to 30 mass %, more preferably from 5 to 20 mass %, whereby precipitation of the polymer is less likely to occur, and a high molecular weight product tends to be obtained. Further, in order to prevent hydrolysis of tetracarboxylic acid diester dichloride, the solvent to be used for production of the polyamic acid ester is preferably dehydrated as far as possible, and it is preferred to carry out the reaction in a nitrogen atmosphere while inclusion of outdoor air is prevented.

(3) Production from Tetracarboxylic Acid Diester and Diamine

The polyamic acid ester may be produced by subjecting tetracarboxylic acid diester and a diamine to polycondensation.

Specifically, the polyamic acid ester may be produced by reacting tetracarboxylic acid diester and a diamine in the presence of a condensation agent, a base and an organic solvent at from 0 to 150° C., preferably from 0 to 100° C. for from 30 minutes to 24 hours, preferably from 3 to 15 hours.

The condensation agent may, for example, be triphenyl phosphite, dicyclohexylcarbodiimide, 1-ethyl-3-(3-dimethylaminopropyl)carbodiimide hydrochloride, N,N∝-carbonyldiimidazole, dimethoxy-1,3,5-triazinylmethyl morpholinium, O-(benzotriazol-1-yl)-N,N,N∝,N∝-tetramethyluronium tetrafluoroborate, O-(benzotriazol-1-yl)-N,N,N∝,N∝-tetramethyluronium hexafluorophosphate or diphenyl(2,3-dihydro-2-thioxo-3-benzoxazolyl)phosphonate. The amount of the condensation agent is preferably from 2 to 3 molar times based on tetracarboxylic acid diester.

As the base, a tertiary amine such as pyridine or triethylamine may be used. The amount of the base is preferably from 2 to 4 molar times based on the diamine component, whereby the base will easily be removed, and a high molecular weight product tends to be obtained.

Further, in the above reaction, the reaction will efficiently proceed by adding a Lewis acid as an additive. The Lewis acid is preferably a lithium halide such as lithium chloride or lithium bromide. The amount of the Lewis acid is preferably from 0 to 1.0 molar time based on the diamine component.

Among the above three processes for producing the polyamic acid ester, particularly preferred is the process (1) or (2), whereby a high molecular weight polyamic acid ester will be obtained.

By pouring the solution of the polyamic acid ester obtained as mentioned above into a poor solvent with well stirring, the polymer can be precipitated. Precipitation is carried out several times, and the precipitate is washed with a poor solvent and dried at room temperature or by heating, whereby a powder of a purified polyamic acid ester can be obtained. The poor solvent is not particularly limited and may, for example, be water, methanol, ethanol, hexane, butyl cellosolve, acetone or toluene.

<Polyimide>

The polyimide to be used in the present invention may be produced by imidizing the above polyamic acid ester or polyamic acid. In a case where the polyimide is produced from the polyamic acid ester, chemical imidization of adding a basic catalyst to the above polyamic acid ester solution or a polyamic acid solution obtained by dissolving the polyamic acid ester resin powder in an organic solvent is easily conducted. Chemical imidization is preferred in that the imidization reaction will proceed at a relatively low temperature, and a decrease in the molecular weight of the obtainable polymer is less likely to occur in the procedure of imidization.

Chemical imidization may be carried out by stirring the polyamic acid ester to be imidized in an organic solvent in a presence of a basic catalyst. As the organic solvent, the solvent to be used in the above-described polymerization reaction may be used. The basic catalyst may, for example, be pyridine, triethylamine, trimethylamine, tributylamine or trioctylamine. Among them, triethylamine, which has sufficient basicity to make the reaction proceed, is preferred.

The temperature at which the imidization reaction is carried out is from −20° C. to 140° C., preferably from 0° C. to 100° C., and the reaction time is from 1 to 100 hours. The amount of the basic catalyst is from 0.5 to 30 molar times, preferably from 2 to 20 molar times the amount of the amic acid ester groups. The imidization degree of the obtainable polymer may be controlled by adjusting the amount of the catalyst, the temperature and the reaction time. Since the added catalyst and the like remain in the solution after the imidization reaction, it is preferred that the obtained imidized polymer is recovered and dissolved in an organic solvent again to obtain the liquid crystal aligning agent of the present invention by the following means.

In a case where the polyimide is produced from the polyamic acid, chemical imidization of adding a catalyst to a solution of the polyamic acid obtained by the reaction of the diamine component and tetracarboxylic acid dianhydride is easily conducted. Chemical imidization is preferred in that the imidization reaction will proceed at a relatively low temperature, and a decrease in the molecular weight of the obtainable polymer is less likely to occur in the procedure of imidization.

Chemical imidization may be carried out by stirring the polyamic acid to be imidized in an organic solvent in the presence of a basic catalyst and an acid anhydride. As the organic solvent, the solvent to be used in the above-described polymerization reaction may be used. The basic catalyst may, for example, be pyridine, triethylamine, trimethylamine, tributylamine or trioctylamine. Among them, pyridine, which has appropriate basicity to make the reaction proceed, is preferred. Further, the acid anhydride may, for example, be acetic anhydride, trimellitic anhydride or pyromellitic anhydride, and among them, acetic anhydride is preferred, whereby purification after completion of the reaction will be easy.

The temperature at which the imidization reaction is carried out is from −20° C. to 140° C., preferably from 0° C. to 100° C., and the reaction time is from 1 to 100 hours. The amount of the basic catalyst is from 0.5 to 30 molar times, preferably from 2 to 20 molar times the amount of the amic acid groups, and the amount of the acid anhydride is from 1 to 50 molar times, preferably from 3 to 30 molar times the amount of the amic acid groups. The imidization degree of the obtainable polymer may be controlled by adjusting the amount of the catalyst, the reaction temperature and the reaction time.

Since the added catalyst and the like remain in the solution after the imidization reaction of the polyamic acid ester or the polyamic acid, it is preferred that the obtained imidized polymer is recovered and dissolved again in an organic solvent to obtain the liquid crystal aligning agent of the present invention by the following means.

By pouring the solution of the polyimide obtained as mentioned above into a poor solvent with well stirring, the polymer can be precipitated. Precipitation is carried out several times, and the precipitate is washed with a poor solvent and dried at room temperature or by heating, whereby a powder of a purified polyamic acid ester can be obtained.

The poor solvent is not particularly limited and may, for example, be methanol, acetone, hexane, butyl cellosolve, heptane, methyl ethyl ketone, methyl isobutyl ketone, ethanol, toluene or benzene.

<Liquid Crystal Aligning Agent>

The liquid crystal aligning agent used in the present invention is in the form of a solution having at least one polymer selected from the group consisting of a polyimide precursor having the bond represented by the above formula (1) and the structural units represented by the above formula (2) and an imidized polymer of the polyimide precursor (hereinafter sometimes referred to as a specific structure polymer) dissolved in an organic solvent. The molecular weight of the specific structure polymer is, by the weigh average molecular weight, preferably from 2,000 to 500,000, more preferably from 5,000 to 300,000, further preferably from 10,000 to 100,000. Further, the number average molecular weight is preferably from 1,000 to 250,000, more preferably from 2,500 to 150,000, further preferably from 5,000 to 50,000.

The concentration of the polymer in the liquid crystal aligning agent used in the present invention may be properly changed depending upon the desired thickness of the coating film to be formed, and it is preferably at least 1 wt % from the viewpoint such that a uniform coating film without defect is to be formed, and is preferably at most 10 wt % in view of the storage stability of the solution.

The organic solvent contained in the liquid crystal aligning agent used in the present invention is not particularly limited so long as the specific structure polymer is uniformly soluble in it.

It may, for example, be N,N-dimethylformamide, N,N-dimethylacetamide, N-methyl-2-pyrrolidone, N-ethyl-2-pyrrolidone, dimethyl sulfoxide, γ-butyrolactone, 1,3-dimethyl-imidazolidinone, methyl ethyl ketone, cyclohexanone, cyclopentanone or 4-hydroxy-4-methyl-2-pentanone.

Among them, it is preferred to use N-methyl-2-pyrrolidone, N-ethyl-2-pyrrolidone or γ-butyrolactone.

Further, in a case where the solubility of the polymer of the present invention in a solvent is high, it is preferred to use a solvent represented by any of the above formulae [D-1] to [D-3].

The amount of the good solvent in the liquid crystal aligning agent of the present invention is preferably from 20 to 99 mass % in the whole of the solvents contained in the liquid crystal aligning agent. It is more preferably from 20 to 90 mass %, further preferably from 30 to 80 mass %.

The liquid crystal aligning agent of the present invention may contain a solvent which improves the coating property and the surface smoothness of a liquid crystal alignment film formed by applying the liquid crystal aligning agent (hereinafter sometimes referred to as a poor solvent) within a range not to impair the effects of the present invention. Specific examples of such a poor solvent are mentioned below, however, the poor solvent is not limited to such specific examples.

For example, ethanol, isopropyl alcohol, 1-butanol, 2-butanol, isobutyl alcohol, tert-butyl alcohol, 1-pentanol, 2-pentanol, 3-pentanol, 2-methyl-1-butanol, isopentyl alcohol, tert-pentyl alcohol, 3-methyl-2-butanol, neopentyl alcohol, 1-hexanol, 2-methyl-1-pentanol, 2-methyl-2-pentanol, 2-ethyl-1-butanol, 1-heptanol, 2-heptanol, 3-heptanol, 1-octanol, 2-octanol, 2-ethyl-1-hexanol,cyclohexanol, 1-methylcyclohexanol, 2-methylcyclohexanol, 3-methylcyclohexanol, 1,2-ethanediol, 1,2-propanediol, 1,3-propanediol, 1,2-butanediol, 1,3-butanediol, 1,4-butanediol, 2,3-butanediol, 1,5-pentanediol, 2-methyl-2,4-pentanediol, 2-ethyl-1,3-hexanediol, dipropyl ether, dibutyl ether, dihexyl ether, dioxane, ethylene glycol dimethyl ether, ethylene glycol diethyl ether, ethylene glycol dibutyl ether, 1,2-butoxyethane, diethylene glycol dimethyl ether, diethylene glycol diethyl ether, diethylene glycol methyl ethyl ether, diethylene glycol dibutyl ether, 2-pentanone, 3-pentanone, 2-hexanone, 2-heptanone, 4-heptanone, 3-ethoxybutyl acetate, 1-methylpentyl acetate, 2-ethylbutyl acetate, 2-ethylhexyl acetate, ethylene glycol monoacetate, ethylene glycol diacetate, propylene carbonate, ethylene carbonate, 2-(methoxymethoxy)ethanol, ethylene glycol monobutyl ether, ethylene glycol monoisoamyl ether, ethylene glycol monohexyl ether, 2-(hexyloxy)ethanol, furfuryl alcohol, diethylene glycol, propylene glycol, propylene glycol monobutyl ether, 1-(butoxyethoxy)propanol, propylene glycol monomethyl ether acetate, dipropylene glycol, dipropylene glycol monomethyl ether, dipropylene glycol monoethyl ether, dipropylene glycol dimethyl ether, tripropylene glycol monomethyl ether, ethylene glycol monomethyl ether acetate, ethylene glycol monoethyl ether acetate, ethylene glycol monobutyl ether acetate, ethylene glycol monoacetate, ethylene glycol diacetate, diethylene glycol monoethyl ether acetate, diethylene glycol monobutyl ether acetate, 2-(2-ethoxyethoxy)ethyl acetate, diethylene glycol acetate, triethylene glycol, triethylene glycol monomethyl ether, triethylene glycol monoethyl ether, methyl lactate, ethyl lactate, methyl acetate, ethyl acetate, n-butyl acetate, propylene glycol monoethyl ether acetate, methyl pyruvate, ethyl pyruvate, methyl 3-methoxypropionate, methylethyl 3-ethoxypropionate, ethyl 3-methoxypropionate, 3-ethoxypropionic acid, 3-methoxypropionic acid, propyl 3-methoxypropionate, butyl 3-methoxypropionate, lactic acid methyl ester, lactic acid ethyl ester, lactic acid n-propyl ester, lactic acid n-butyl ester, lactic acid isoamyl ester, and solvents represented by the above formulae [D-1 ] to [D-3] may, for example, be mentioned.

Among them, it is preferred to use 1-hexanol, cyclohexanol, 1,2-ethanediol, 1,2-propanediol, propylene glycol monobutyl ether, ethylene glycol monobutyl ether or dipropylene glycol dimethyl ether.

The amount of such a poor solvent is preferably from 1 to 80 mass % in the whole of the solvents contained in the liquid crystal aligning agent. It is more preferably from 10 to 80 mass %, further preferably from 20 to 70 mass %.

The liquid crystal aligning agent of the present invention may contain, in addition to the above, within a range not to impair the effects of the present invention, a polymer other than the above polymer of the present invention, a dielectric or conductive material for the purpose of changing electrical properties such as the dielectric constant or the electrical conductivity of the obtainable liquid crystal alignment film, a silane coupling agent for the purpose of improving the adhesion between the liquid crystal alignment film and the substrate, a crosslinkable compound for the purpose of increasing the hardness and the denseness of the obtainable liquid crystal alignment film, an imidization accelerator for the purpose of making the imidization by heating of the polyimide precursor at the time of baking the coating film efficiently proceed, etc.

<Liquid Crystal Alignment Film>
<Method for Producing Liquid Crystal Alignment Film>

The liquid crystal alignment film of the present invention is a film obtained by applying the liquid crystal aligning agent on a substrate, and drying and baking it. The substrate on which the liquid crystal aligning agent of present invention is applied is not particularly limited so long as it is a highly transparent substrate, and a glass substrate, a silicon nitride substrate or a plastic substrate such as an acrylic substrate or a polycarbonate substrate may, for example, be used, and it is preferred to use a substrate having ITO electrodes and the like to drive the liquid crystal formed thereon, in view of simplification of the process. Further, for a reflective liquid crystal display device, an opaque substrate such as a silicon wafer may be used only for a substrate on one side, and in such a case, as an electrode, a material which reflects light such as aluminum may be used.

As a method of applying the liquid crystal aligning agent of the present invention, a spin coating method, a printing method or an ink jet method may, for example, be mentioned. For the drying and baking steps after application of the liquid crystal aligning agent of the present invention, optional temperature and time may be selected. Usually, in order to sufficiently remove the organic solvent contained, the liquid crystal aligning agent is dried at from 50° C. to 120° C. for from 1 minute to 10 minutes, and baked at from 150° C. to 300° C. from 5 minutes to 120 minutes. The thickness of the coating film after baking is not particularly limited, however, if the coating film is too thin, the reliability of a liquid crystal display device may be lowered in some cases, and accordingly it is from 5 to 300 nm, preferably from 10 to 200 nm.

As a method of subjecting the obtained liquid crystal alignment film to alignment treatment, a rubbing method or photo-alignment treatment may, for example, be mentioned.

Here, rubbing treatment may be carried out by using an existing rubbing apparatus. On that occasion, the material of the rubbing cloth may, for example, be cotton, nylon or rayon. As conditions of the rubbing treatment, usually, a rotational speed of from 300 to 2,000 rpm, a feed rate of from 5 to 100 mm/s and a pushing amount of from 0.1 to 1.0 mm are employed. Then, residues formed by rubbing are removed by ultrasonic cleaning using e.g. pure water or an alcohol.

As a specific example of the photo-alignment treatment, a method may be mentioned in which the coating film surface is irradiated with radioactive rays polarized in a constant direction, and in some cases, heat treatment at a temperature of from 150 to 250° C. is further carried out to impart liquid crystal alignment performance. As the radioactive rays, ultraviolet rays and visible light having a wavelength of from 100 nm to 800 nm may be used. Among them, preferred are ultraviolet rays having a wavelength of from 100 nm to 400 nm, particularly preferably from 200 nm to 400 nm. Further, in order to improve the liquid crystal alignment property, the coating film substrate may be irradiated with radioactive rays while the substrate is heated at from 50 to 250° C. The amount of irradiation with radioactive rays is preferably from 1 to 10,000 mJ/cm$^2$, particularly preferably from 100 to 5,000 mJ/cm$^2$. In the above prepared liquid crystal alignment film, liquid crystal molecules can be stably aligned in a constant direction.

The extinction ratio of the polarized ultraviolet rays is preferably higher, whereby higher anisotropy can be imparted. Specifically, the extinction ratio of the linearly polarized ultraviolet rays is preferably at least 10:1, more preferably at least 20:1.

The above film irradiated with the polarized radioactive rays may then be subjected to a contact treatment with a solvent containing at least one member selected from water and organic solvents.

The solvent to be used for the contact treatment is not particularly limited so long as a decomposed product formed by irradiation with light is soluble in it. It may, for example, be specifically water, methanol, ethanol, 2-propanol, acetone, methyl ethyl ketone, 1-methoxy-2-propanol, 1-methoxy-2-propanol acetate, butyl cellosolve, ethyl lactate, methyl lactate, diacetone alcohol, methyl 3-methoxypropionate, ethyl 3-ethoxypropionate, propyl acetate, butyl acetate or cyclohexyl acetate. Such solvents may be used in combination of two or more.

In view of general purpose properties and safety, more preferred is at least one member selected from the group consisting of water, 2-propanol, 1-methoxy-2-propanol and ethyl lactate. Particularly preferred is water, 2-propanol or a mixture of water and 2-propanol.

In the present invention, the contact treatment of the film irradiated with the polarized radioactive rays with the solution containing an organic solvent is carried out by a treatment such that the film and the solution are preferably sufficiently brought into contact with each other, such as a dipping treatment or a spray treatment. Among them, preferred is a method of dipping the film in the solution containing an organic solvent for preferably from 10 seconds to 1 hour, more preferably from 1 to 30 minutes. The contact treatment may be carried out at room temperature or with heating, and is preferably carried out at from 10 to 80° C., more preferably from 20 to 50° C. Further, as the case requires, a means to improve the contact efficiency, such as application of ultrasonic waves, may be applied.

After the above contact treatment, for the purpose of removing the organic solvent in the solution used, either one or both of rinsing with a low boiling point solvent such as water, methanol, ethanol, 2-propanol, acetone or methyl ethyl ketone, and drying, may be carried out.

Further, the film subjected to the contact treatment with the solvent may be heated at 150° C. or higher for the purpose of drying the solvent and re-aligning the molecular chain in the film.

The heating temperature is preferably from 150 to 300° C. The higher the temperature is, the more re-alignment of the molecular chain is accelerated, however, if the temperature is too high, the molecular chain may be decomposed. Accordingly, the heating temperature is more preferably from 180 to 250° C., particularly preferably from 200 to 230° C.

If the heating time is too short, the effect of re-aligning the molecular chain may not be obtained, and if it is too long, the molecular chain may be decomposed, and accordingly it is preferably from 10 seconds to 30 minutes, more preferably from 1 minute to 10 minutes.

<Liquid Crystal Display Device>

The liquid crystal display device of the present invention is characterized by having the liquid crystal alignment film obtained by the method for producing a liquid crystal alignment film described above.

The liquid crystal display device of the present invention is obtained by forming a substrate provided with a liquid crystal alignment film using the liquid crystal aligning agent of the present invention by the method for producing a liquid crystal alignment film, preparing a liquid crystal cell by a known means thereby to produce the liquid crystal display device using it.

The method for preparing a liquid crystal cell will be described with reference to a passive matrix structure liquid crystal display device as an example. The liquid crystal display device may be an active matrix structure liquid crystal display device having switching elements such as a TFT (thin film transistor) provided on the respective pixel portions constituting an image display.

First, transparent glass substrates are prepared, and common electrodes are provided on one substrate, and segment electrodes are provided on the other substrate. Such electrodes may, for example, be ITO electrodes, and are patterned so as to display a desired image. Then, on the respective substrates, an insulating film is provided so as to cover the common electrodes and the segment electrodes. The insulating film may, for example, be a film made of $SiO_2$—$TiO_2$ formed by a sol-gel method.

Then, on the respective substrates, the liquid crystal alignment film of the present invention is formed. Then, one substrate is overlaid on the other substrate so that the respective alignment films face each other, and the periphery is bonded by a sealing material. Usually, spacers are mixed with the sealing agent so as to control the gap between the substrates. Further, it is preferred to spread spacers for controlling the gap between the substrates also on an inner portion where the sealing material is not provided. An opening through which the liquid crystal is injected from the outside is provided on a part of the sealing material.

Then, through the opening provided on the sealing material, a liquid crystal material is injected into a space surrounded by the two substrates and the sealing material. Then, the opening is sealed with an adhesive. For injection, a vacuum injection method may be employed, or a method utilizing capillarity in the atmosphere may be employed. Then, polarizing plates are placed. Specifically, a pair of polarizing plates are bonded to each of the two substrates on a side opposite from the liquid crystal layer. By the above procedure, the liquid crystal display device of the present invention is obtained.

In the present invention, as the sealing agent, a resin to be cured by irradiation with ultraviolet rays or by heating, having a reactive group such as an epoxy group, an acryloyl group, a methacryloyl group, a hydroxy group, an allyl group or an acetyl group, is used. Particularly, it is preferred to use a curable resin having both reactive groups of an epoxy group and a (meth)acryloyl group.

The sealing agent of the present invention may contain an inorganic filler for the purpose of improving the bonding property and the moisture resistance. The inorganic filler to be used is not particularly limited and may, for example, be spherical silica, molten silica, crystalline silica, titanium oxide, titanium black, silicon carbide, silicon nitride, boron nitride, calcium carbonate, magnesium carbonate, barium sulfate, calcium sulfate, mica, talc, clay, alumina, magnesium oxide, zirconium oxide, aluminum hydroxide, calcium silicate, aluminum silicate, lithium aluminum silicate, zirconium silicate, barium titanate, glass fibers, carbon fibers, molybdenum disulfide or asbestos, and is preferably spherical silica, molten silica, crystalline silica, titanium oxide, titanium black, silicon nitride, boron nitride, calcium carbonate, barium sulfate, calcium sulfate, mica, talc, clay, alumina, aluminum hydroxide, calcium silicate or aluminum silicate. Such inorganic fillers may be used as a mixture of two or more.

EXAMPLES

Now, the present invention will be described in further detail with reference to Examples. However, it should be understood that the present invention is by no means restricted to such specific Examples. Abbreviations of compounds and methods for measuring the respective properties used in Examples of the present invention and Comparative Examples are as follows.

NMP: N-methyl-2-pyrrolidone
BCS: butyl cellosolve
DA-A: N-tert-butoxycarbonyl-N-(2-(4-aminophenyp-ethyl)-N-(4-aminobenzyl)amine
DA-1: 1,2-bis(4-aminophenoxy)ethane
DA-2: N-2-(4-aminophenylethyl)-N-methylamine
DA-3: 2-tert-butoxycarbonylaminomethyl-p-phenylenediamine (in the formula, Boc represents a tert-butoxycarbonyl group)
DA-4: N,Nα-bis(4-aminophenyl)-N,Nα-bis(tert-butoxycarbonyl)-1,2-diaminoethane (in the formula, Boc represents a tert-butoxycarbonyl group)
DA-5: the following formula (DA-5)
DA-6: the following formula (DA-6)
DA-7: the following formula (DA-7)
DA-8: the following formula (DA-8)
DAH-1: the following formula (DAH-1)

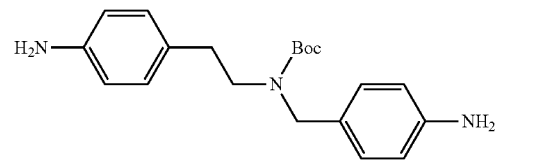
DA-A

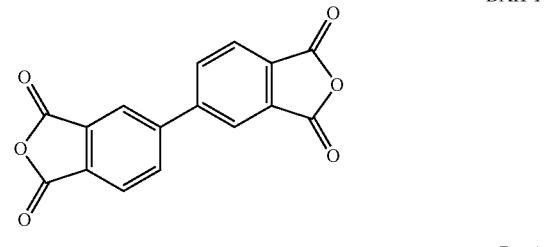
DAH-1

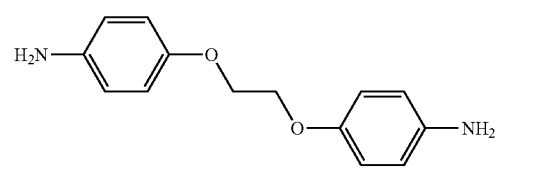
DA-1

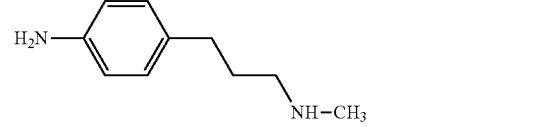
DA-2

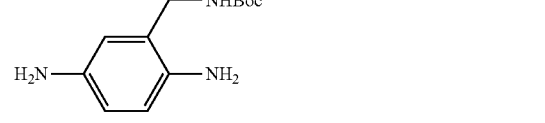
DA-3

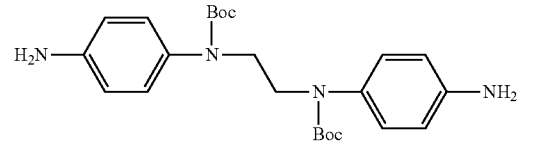
DA-4

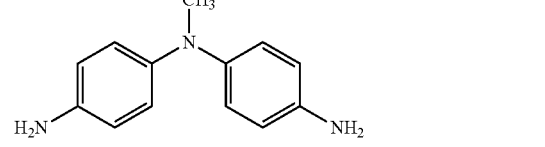
DA-5

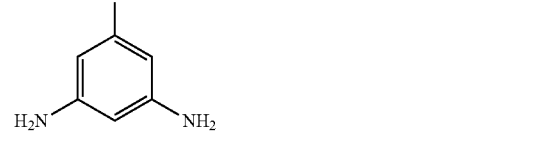
DA-6

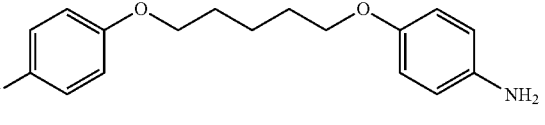
DA-7

DA-8

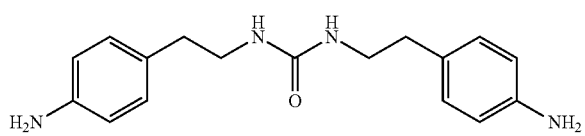

Methods for measuring the respective properties used in Examples are as follows.

[¹H NMR]
Apparatus: Fourier transform superconducting nuclear magnetic resonance apparatus (FT-NMR) INOVA-400 (manufactured by Varian) 400 MHz
 Solvent: Deuterated dimethyl sulfoxide (DMSO-$d_6$)
 Standard substance: Tetramethylsilane (TMS)
 Number of scans: 8 or 32

[¹³C{¹H}NMR]
Apparatus: Fourier transform superconducting nuclear magnetic resonance apparatus (FT-NMR) INOVA-400 (manufactured by Varian) 100 MHz
 Solvent: Deuterated dimethyl sulfoxide (DMSO-d6)
 Standard substance: Tetramethylsilane (TMS)
 Number of scans: 256

[DSC]
Apparatus: Differential scanning calorimetry measuring apparatus DSC1STARe system (manufactured by Mettler-Toredo International Inc.)
 Pan: sealed Au pan
 Temperature-increasing rate: 10° C./min
 Melting point: The lowest endothermic peak temperature was analyzed.

[Viscosity]
In each Preparation Example, the viscosity of each of the polyamic acid ester and polyamic acid solutions was measured using an E type viscometer TVE-22H (manufactured by Toki Sangyo Co., Ltd.) with a sample amount of 1.1 mL with cone roter TE-1 (1° 34α, R24) at a temperature of 25° C.

[Molecular Weight]
With respect to the molecular weight of the polyamic acid ester, the number average molecular weight (hereinafter sometimes referred to as Mn) and the weight average molecular weight (hereinafter sometimes referred to as Mw) as values as calculated as polyethylene glycol and polyethylene oxide, were calculated by measurement by a GPC (room temperature gel permeation chromatography) apparatus.
 GPC apparatus: Shodex (GPC-101)
 Column: Shodex (KD803 and KD805 in series)
 Column temperature: 50° C.
 Eluent: N,N-Dimethylformamide (as additives, 30 mmol/L of lithium bromide monohydrate (LiBr.$H_2O$), 30 mmol/L of phosphoric acid anhydrous crystals (o-phosphoric acid) and 10 ml/L of tetrahydrofuran (THF))
 Flow rate: 1.0 ml/min
 Standard sample for preparation of calibration curve: TSK standard polyethylene oxide (weight average molecular weight (Mw): about 900,000, 150,000, 100,000 and 30,000) manufactured by TOSOH CORPORATION, and polyethylene glycol (peak top molecular weight (Mp): about 12,000, 4,000 and 1,000) manufactured by Polymer Laboratories Ltd.

In order to prevent peaks from overlapping with one another, two kinds of samples i.e. a sample having four types of polymers with molecular weights of 900,000, 100,000, 12,000 and 1,000 mixed and a sample having three types of polymers with molecular weights of 150,000, 30,000 and 4,000 mixed, were separately subjected to measurement.

[Measurement of Imidization Degree]
The imidization degree in each Preparation Example was measured as follows. 20 mg of a polyimide powder was put in a NMR sample tube (NMR sampling tube standard, diameter: 5 (manufactured by KUSANO SCIENCE CORPORATION), deuterated dimethyl sulfoxide (DMSO-d6, 0.05% TMS (tetramethylsilane) mixed) (0.53 ml) was added, and ultrasonic waves were applied to completely dissolve the polyimide powder. The solution was subjected to 500 MHz proton NMR measurement by a NMR measuring apparatus (JNW-ECA500) (manufactured by JEOL Ltd. DATUM Solution Business Operations). The imidization degree was determined in accordance with the following formula from the peak integrated value of proton derived from a structure which did not change between before and after the imidization as standard proton, and the peak integrated value of proton derived from the NH group of the amide acid which appeared in the vicinity of from 9.5 ppm to 10.0 ppm.

Imidization degree (%)=(1−α·x/y)×100

In the above formula, x is the peak integrated value of proton derived from the NH group of the amide acid, y is the peak integrated value of standard proton, and α is the proportion of the number of standard proton per one proton derived from the NH group of the amide acid in the case of a polyamide acid (imidization degree: 0%).

<Evaluation of Adhesion>
By a precision universal tester (manufactured by Shimadzu Corporation, AGS-X500N), edges of top and bottom substrates of a sample for evaluation of adhesion were fixed, a center portion of the substrates was pressed from above, and a pressure (N) at the time of peeling was measured.

<Preparation of Diamine Compound>
[Preparation of Aromatic Diamine Compound (DA-A)]

Preparation of Aromatic Diamine Compound (DA-A): N-tert-butoxycarbonyl-N-(2-(4-aminophenyl)ethyl)-N-(4-aminobenzyl)amine

PREPARATION EXAMPLE 1

An aromatic diamine compound (DA-A) was prepared in the following three steps.

First Step: Preparation of N-(2-(4-nitrophenyl)ethyl)-N-(4-nitrobenzyl)amine (DA-A-1)

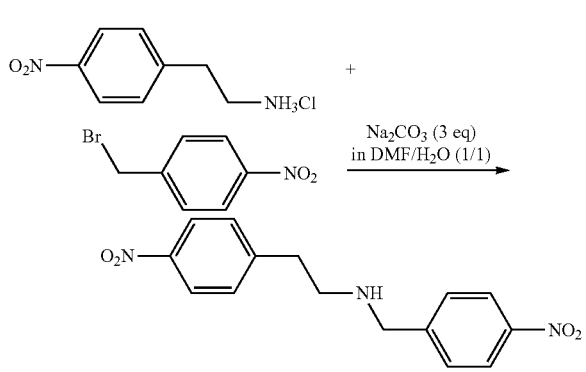

DA-A-1

2-(4-Nitrophenyl)ethylamine hydrochloride (50.0 g, 247 mmol) was dissolved in water (300 g) and DMF (50.0 g), sodium carbonate (78.4 g, 740 mmol) was added, and a DMF solution (200 g) of 4-nitrobenzyl bromide (53.3 g, 247 mmol) was dropwise added at 25° C. over a period of 1 hour. During dropwise addition, DMF/water=1/1 (w/w, 100 g) was further added to overcome stirring failure by precipitates. The mixture was stirred as it was at room temperature for 20 hours and further stirred at 40° C. for 4 hours, whereupon disappearance of the raw materials was confirmed by HPLC. Then, the reaction liquid was left to cool at room temperature, and the precipitates were collected by filtration, washed twice with water (150 g) and twice with 2-propanol (50.0 g) and vacuum dried at 50° C. to obtain N-2-(4-nitrophenyl)ethyl-N-(4-nitrobenzyl)amine (white solid, amount obtained: 73 g, yield: 99%).

$^1$H NMR (DMSO-$d_6$): δ 8.18 (d, J=8.8 Hz, 2H, C$_6$H$_4$), 8.15 (d, J=8.8 Hz, 2H, C$_6$H$_4$), 7.59, (d, J=8.8 Hz, 2H, C$_6$H$_4$), 7.52 (d, J=8.8 Hz, 2H, C$_6$H$_4$), 3.87 (s, 2H, CH$_2$), 2.91 (t, J=7.0 Hz, 2H, CH$_2$), 2.80 (t, J=7.0 Hz, 2H, CH$_2$), 2.46 (s, 1H, NH). $^{13}$C{$^1$H} NMR (DMSO-$d_6$): δ 149.8, 149.5, 146.6, 146.3, 130.3, 129.2, 123.7, 123.6, 52.4, 50.0, 36.0 (each s).

Melting point (DSC): 123° C.

Second Step: Preparation of N-tert-butoxycarbonyl-N-(2-(4-nitrophenyl)ethyl)-N-(4-nitrobenzyl)amine (DA-A-2)

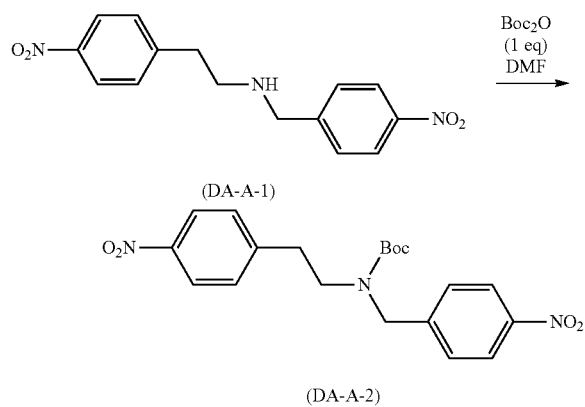

N-2-(4-Nitrophenyl)ethyl-N-4-nitrobenzylamine (73 g, 0.24 mol) was dissolved in DMF (371 g), and di-tert-butyl dicarbonate (54 g, 0.24 mol) was dropwise added at from 2 to 8° C. over a period of 10 minutes. Then, the mixture was stirred at 20° C. for 4 hours, and disappearance of the raw materials was confirmed. Then, DMF was distilled off under reduced pressure, and the reaction liquid was mixed with ethyl acetate (371 g) and washed three times with water (371 g). Then, the organic phase was concentrated to obtain an orange oil (crude amount obtained: 96 g, crude yield: 97%). The crude product was purified by silica gel column chromatography (hexane/ethyl acetate=7/3 (v/v, Rf=0.3)) to obtain a yellow oil (crude amount obtained: 82.0 g, crude yield: 82.8% (two steps)).

The yellow oil was mixed with methanol (118 g) and dissolved at 50° C., and the solution was cooled with stirring, followed by stirring at from 0 to 5° C. for 30 minutes, and the solution was subjected to filtration, followed by drying to obtain N-tert-butoxycarbonyl-N-2-(4-nitrophenyl)ethyl-N-4-nitrobenzylamine (white powder, amount obtained: 74.5 g, yield: 78% (two steps)).

$^1$H NMR (DMSO-$d_6$): δ 8.22 (d, J=8.4 Hz, 2H, C$_6$H$_4$), 8.18-8.16 (br, 2H, C$_6$H$_4$), 7.51 (d, J=8.4 Hz, 2H, C$_6$H$_4$), 7.48 (br, 2H, C$_6$H$_4$), 4.57-4.54 (br, 2H, CH$_2$), 3.55-3.49 (br, 2H, CH$_2$), 2.97 (br, 2H, CH$_2$), 1.36-1.32 (br, 9H, tert-Bu). $^{13}$C{$^1$H} NMR (DMSO-$d_6$): δ 155.2, 154.8, 147.9, 147.5, 147.1, 147.0, 146.5, 130.6, 128.7, 128.4, 124.0, 123.8, 79.7, 50.3, 49.2, 48.4, 34.3, 34.0, 28.2 (each s).

Melting point (DSC): 77° C.

Third Step: Preparation of N-tert-butoxycarbonyl-N-(2-(4-aminophenyl)ethyl)-N-(4-aminobenzyl)amine (DA-A)

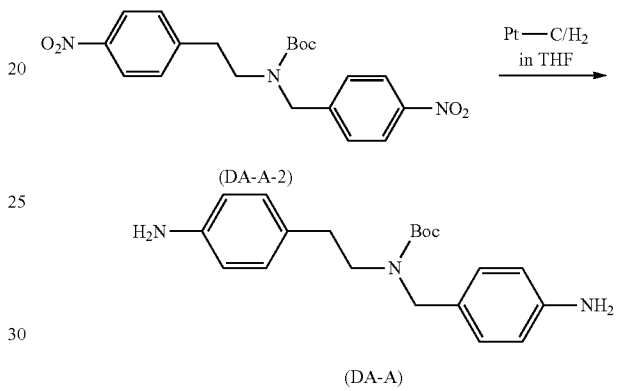

N-tert-Butoxycarbonyl-N-2-(4-nitrophenyl)ethyl-N-4-nitrobenzylamine (74 g, 0.18 mol) was dissolved in tetrahydrofuran (370 g), and 3% platinum-carbon (7.4 g) was added, followed by stirring in a hydrogen atmosphere at room temperature for 72 hours. Disappearance of the raw material was confirmed by HPLC, the catalyst was removed by filtration, and the filtrate was concentrated and dried to obtain crude DA-A as a pale yellow oil (crude amount obtained: 66 g, crude yield: 105%). The crude product was dissolved in toluene (198 g) at 80° C., followed by stirring at 2° C. for one hour to precipitate crystals. The precipitated crystals were collected by filtration and dried to obtain DA-A (white powder, amount obtained: 56 g, yield: 90%).

$^1$H NMR (DMSO-$d_6$): δ 6.92 (d, J=8.0 Hz, 2H, C$_6$H$_4$), 6.84-6.76 (br, 2H, C$_6$H$_4$), 6.54 (d, J=8.0 Hz, 2H, C$_6$H$_4$), 6.50 (d, J=8.0 Hz, 2H, C$_6$H$_4$), 4.98 (s, 2H, NH$_2$), 4.84 (s, 2H, NH$_2$), 4.16 (br, 2H, CH$_2$), 3.13 (br, 2H, CH$_2$), 2.51 (br, 2H, CH$_2$), 1.41 (s, 9H, tert-Bu). $^{13}$C{$^1$H} NMR (DMSO-$d_6$): δ 155.4, 154.9, 148.2, 147.2, 129.5, 129.3, 129.1, 128.9, 126.6, 125.7, 114.5, 114.3, 78.9, 78.8, 50.2, 49.2, 48.4, 33.9, 33.3, 28.5 (each s).

Melting point (DSC): 103° C.

PREPARATION EXAMPLE 2

Into a 100 mL four-necked flask equipped with a stirring apparatus and a nitrogen introduction tube, 2.93 g (12.00 mmol) of DA-1 and 4.43 g (11.99 mmol) of DA-A were weighed, and 81.98 g of NMP was added, followed by stirring while nitrogen was supplied, to dissolve DA-1 and DA-A. 5.35 g (23.88 mmol) of 1,3-dimethyl-1,2,3,4-cyclobutanetetracarboxylic dianhydride was added to the resulting diamine solution with stirring, and 9.11 g of NMP was further added so that the solid content concentration would be 12 mass %, followed by stirring at room temperature for 24 hours to obtain a polyamic acid solution (PAA-1). The viscosity of the polyamic acid solution at a temperature of 25° C. was 205 mPa·s. Further, Mn of the polyamic acid was 10,530 and Mw was 29,900.

PREPARATION EXAMPLE 3

Into a 100 ml four-necked flask equipped with a stirring apparatus and a nitrogen introduction tube, 20 g of the obtained polyamic acid solution (PAA-1) was weighed, and 14.29 g of NMP was added, followed by stirring for 30 minutes. To the obtained polyamic acid solution, 1.48 g of acetic anhydride and 0.38 g of pyridine were added, followed by heating at 60° C. for 3 hours to conduct chemical imidization. The obtained reaction liquid was poured into 139 ml of methanol with stirring, and the obtained precipitate was collected by filtration and washed three times with 139 ml of methanol. The obtained resin powder was dried at 60° C. for 12 hours to obtain a polyimide resin powder.

Of the polyimide resin powder, the imidization degree was 75%, Mn was 7,120 and Mw was 12,485.

1.80 g of the obtained polyimide resin powder was weighed in a 50 ml Erlenmeyer flask in which a stirrer was put, and 13.20 g of NMP was added, followed by stirring at 40° C. for 24 hours to dissolve the polyimide resin powder to obtain a polyimide solution (PI-1).

PREPARATION EXAMPLE 4

Into a 100 mL four-necked flask equipped with a stirring apparatus and a nitrogen introduction tube, 1.91 g (7.82 mmol) of DA-1, 1.56 g (10.40 mmol) of DA-2 and 2.67 g (7.81 mmol) of DA-A were weighed, and 55.18 g of NMP was added, followed by stirring while nitrogen was supplied to dissolve DA-1, DA-2 and DA-A. 5.22 g (23.92 mmol) of pyromellitic dianhydride was added to the resulting diamine solution with stirring, and 28.04 g of NMP was further added so that the solid content concentration would be 12 mass %, followed by stirring at room temperature for 24 hours to obtain a polyamic acid solution (PAA-2). The viscosity of the polyamic acid solution at a temperature of 25° C. was 600 mPa·s. Further, Mn of the polyamic acid was 17,370 and Mw was 41,450.

PREPARATION EXAMPLE 5

Into a 50 mL four-necked flask equipped with a stirring apparatus and a nitrogen introduction tube, 3.69 g (9.99 mmol) of DA-A was weighed, and 39.16 g of NMP was added, followed by stirring while nitrogen was supplied to dissolve DA-A. 2.24 g (9.98 mmol) of 1,3-dimethyl-1,2,3,4-cyclobutanetetracarboxylic dianhydride was added to the resulting diamine solution with stirring, and 4.35 g of NMP was further added so that the solid content concentration would be 12 mass %, followed by stirring at room temperature for 24 hours to obtain a polyamic acid solution (PAA-3). The viscosity of the polyamic acid solution at a temperature of 25° C. was 60 mPa·s. Further, Mn of the polyamic acid was 12,940 and Mw was 28,468.

PREPARATION EXAMPLE 6

Into a 100 mL four-necked flask equipped with a stirring apparatus and a nitrogen introduction tube, 3.52 g (14.40 mmol) of DA-1 and 3.55 g (9.60 mmol) of DA-A were weighed, and 81.6 g of NMP was added, followed by stirring while nitrogen was supplied to dissolve DA-1 and DA-A. 5.30 g (23.64 mmol) of 1,3-dimethyl-1,2,3,4-cyclobutanetetracarboxylic dianhydride was added to the resulting diamine solution with stirring, and 9.07 g of NMP was further added so that the solid content concentration would be 12 mass %, followed by stirring at room temperature for 24 hours to obtain a polyamic acid solution (PAA-4). The viscosity of the polyamic acid solution at a temperature of 25° C. was 230 mPa·s. Further, Mn of the polyamic acid was 19,890 and Mw was 39,960.

Into a 100 ml four-necked flask equipped with a stirring apparatus and a nitrogen introduction tube, 25 g of the obtained polyamic acid solution (PAA-4) was weighed, and 8.33 g of NMP was added, followed by stirring for 30 minutes. To the obtained polyamic acid solution, 1.78 g of acetic anhydride and 0.46 g of pyridine were added, followed by heating at 55° C. for 3 hours to conduct chemical imidization. The obtained reaction liquid was poured into 137 ml of methanol with stirring, and the obtained precipitate was collected by filtration and washed three times with 140 ml of methanol. The obtained resin powder was dried at 60° C. for 12 hours to obtain a polyimide resin powder.

Of the polyimide resin powder, the imidization degree was 67%, Mn was 13,480 and Mw was 24,000.

Into a 50 ml Erlenmeyer flask in which a stirrer was put, 2.42 g of the obtained polyimide resin powder was weighed, and 17.75 g of NMP was added, followed by stirring at 40° C. for 24 hours to dissolve the polyimide resin powder to obtain a polyimide solution (PI-2).

PREPARATION EXAMPLE 7

Into a 100 mL four-necked flask equipped with a stirring apparatus and a nitrogen introduction tube, 2.25 g (9.20 mmol) of DA-1 and 5.10 g (13.80 mmol) of DA-A were weighed, and 82.47 g of NMP was added, followed by stirring while nitrogen was supplied to dissolve DA-1 and DA-A. 5.15 g (22.98 mmol) of 1,3-dimethyl-1,2,3,4-cyclobutanetetracarboxylic dianhydride was added to the resulting diamine solution with stirring, and 9.07 g of NMP was further added so that the solid content concentration would be 12 mass %, followed by stirring at room temperature for 24 hours to obtain a polyamic acid solution (PAA-5). The viscosity of the polyamic acid solution at a temperature of 25° C. was 120 mPa·s. Further, Mn of the polyamic acid was 12,120 and Mw was 29,310.

Into a 100 ml four-necked flask equipped with a stirring apparatus and a nitrogen introduction tube, 25 g of the obtained polyamic acid solution (PAA-5) was weighed, and 8.33 g of NMP was added, followed by stirring for 30 minutes. To the obtained polyamic acid solution, 1.69 g of acetic anhydride and 0.44 g of pyridine were added, followed by heating at 55° C. for 3 hours to conduct chemical imidization. The obtained reaction liquid was poured into 136 ml of methanol with stirring, and the obtained precipitate was collected by filtration and washed three times with 136 ml of methanol. The obtained resin powder was dried at 60° C. for 12 hours to obtain a polyimide resin powder.

Of the polyimide resin powder, the imidization degree was 68%, Mn was 8,300 and Mw was 22,020.

Into a 50 ml Erlenmeyer flask in which a stirrer was put, 2.38 g of the obtained polyimide resin powder was weighed, and 17.45 g of NMP was added, followed by stirring at 40° C. for 24 hours to dissolve the polyimide resin powder to obtain a polyimide solution (PI-3).

PREPARATION EXAMPLE 8

Into a 100 mL four-necked flask equipped with a stirring apparatus and a nitrogen introduction tube, 0.54 g (5.00 mmol) of p-phenylenediamine, 1.83 g (7.50 mmol) of DA-1 and 4.62 g (12.50 mmol) of DA-A were weighed, and 82.57 g of NMP was added, followed by stirring while nitrogen was supplied to dissolve p-phenylenediamine, DA-1 and DA-A. 5.57 g (24.83 mmol) of 1,3-dimethyl-1,2,3,4-cyclobutanetetracarboxylic dianhydride was added to the resulting diamine solution with stirring, and 9.17 g of NMP was further added so that the solid content concentration would be 12 mass %, followed by stirring at room temperature for 24 hours to obtain a polyamic acid solution (PAA-6). The viscosity of the polyamic acid solution at a temperature of 25° C. was 132 MPa·s. Further, Mn of the polyamic acid was 19,150 and Mw was 34,500.

Into a 100 mL four-necked flask equipped with a stirring apparatus and a nitrogen introduction tube, 25 g of the obtained polyamic acid solution (PAA-6) was weighed, and 9.17 g of NMP was added, followed by stirring for 30 minutes. To the obtained polyamic acid solution, 3.66 g of acetic anhydride and 0.95 g of pyridine were added, followed by heating at 55° C. for 3 hours to conduct chemical imidization. The obtained reaction liquid was poured into 320 ml of methanol with stirring, and the obtained precipitate was collected by filtration and washed three times with 140 ml of methanol. The obtained resin powder was dried at 60° C. for 12 hours to obtain a polyimide resin powder.

Of the polyimide resin powder, the imidization degree was 75%, Mn was 13,930 and Mw was 30,010.

Into a 50 ml Erlenmeyer flask in which a stirrer was put, 3.60 g of the obtained polyimide resin powder was weighed, and 26.40 g of NMP was added, followed by stirring at 40° C. for 24 hours to dissolve the polyimide resin powder to obtain a polyimide solution (PI-4).

PREPARATION EXAMPLE 9

Into a 100 mL four-necked flask equipped with a stirring apparatus and a nitrogen introduction tube, 4.27 g (20.00 mmol) of DA-5 and 0.76 g (5.00 mmol) of DA-6 were weighed, and 31.31 g of NMP and 44.73 g of GBL were added, followed by stirring while nitrogen was supplied to dissolve DA-5 and DA-6. 7.19 g (24.45 mmol) of DAH-1 was added to the resulting diamine solution with stirring, and 13.57 g of NMP was further added so that the solid content concentration would be 12 mass %, followed by stirring at room temperature for 24 hours to obtain a polyamic acid (PAA-7) solution. The viscosity of the polyamic acid solution at a temperature of 25° C. was 810 mPa·s.

PREPARATION EXAMPLE 10

Into a 100 mL four-necked flask equipped with a stirring apparatus and a nitrogen introduction tube, 1.43 g (5.00 mmol) of DA-7, 2.98 g (10.00 mmol) of DA-8 and 1.50 g (10.00 mmol) of DA-8 were weighed, and 65.23 g of NMP was added, followed by stirring while nitrogen was supplied to dissolve DA-7, DA-8 and DA-8. 4.56 g (23.25 mmol) of 1,2,3,4-cyclobutanetetracarboxylic dianhydride was added to the resulting diamine solution with stirring, and 29.00 g of NMP was further added so that the solid content concentration would be 10 mass %, followed by stirring at room temperature for 24 hours to obtain a polyamic acid (PAA-8) solution. The viscosity of the polyamic acid solution at a temperature of 25° C. was 190 mPa·s.

PREPARATION EXAMPLE 11

Into a 100 mL four-necked flask equipped with a stirring apparatus and a nitrogen introduction tube, 5.37 g (21.98 mmol) of DA-1 was weighed, and 54.05 g of NMP was added, followed by stirring while nitrogen was supplied to dissolve DA-1. 4.64 g (20.70 mmol) of 1,3-dimethyl-1,2,3,4-cyclobutanetetracarboxylic dianhydride was added to the resulting diamine solution with stirring, and 36.04 g of NMP was further added so that the solid content concentration would be 12 mass %, followed by stirring at room temperature for 24 hours to obtain a polyamic acid solution (PAA-9). The viscosity of the polyamic acid solution at a temperature of 25° C. was 520 mPa·s. Further, Mn of the polyamic acid was 17,900, and Mw was 43,950.

PREPARATION EXAMPLE 12

Into a 50 mL four-necked flask equipped with a stirring apparatus and a nitrogen introduction tube, 1.71 g (7.00 mmol) of DA-1 and 1.66 g (7.00 mmol) of DA-3 were weighed, and 41.93 g of NMP was added, followed by stirring while nitrogen was supplied to dissolve DA-1 and DA-3. 2.98 g (13.31 mmol) of 1,3-dimethyl-1,2,3,4-cyclobutanetetracarboxylic dianhydride was added to the resulting diamine solution with stirring, and 4.66 g of NMP was further added so that the solid content concentration would be 12 mass %, followed by stirring at room temperature for 24 hours to obtain a polyamic acid solution (PAA-10). The viscosity of the polyamic acid solution at a temperature of 25° C. was 225 mPa·s. Further, Mn of the polyamic acid was 14,780 and Mw was 30,350.

PREPARATION EXAMPLE 13

Into a 50 mL four-necked flask equipped with a stirring apparatus and a nitrogen introduction tube, 1.34 g (5.50 mmol) of DA-1 and 2.43 g (5.50 mmol) of DA-4 were weighed, and 40.39 g of NMP was added, followed by stirring while nitrogen was supplied to dissolve DA-1 and DA-4. 2.35 g (10.49 mmol) of 1,3-dimethyl-1,2,3,4-cyclobutanetetracarboxylic dianhydride was added to the resulting diamine solution with stirring, and 4.49 g of NMP was further added so that the solid content concentration would be 12 mass %, followed by stirring at room temperature for 24 hours to obtain a polyamic acid solution (PAA-11). The viscosity of the polyamic acid solution at a temperature of 25° C. was 185 mPa·s. Further, Mn of the polyamic acid was 20,600, and Mw was 42,900.

EXAMPLE 1

15.00 g of the 12 mass % polyamic acid solution (PAA-1) obtained in Preparation Example 2 was weighed in a 100 ml Erlenmeyer flask, and 9.00 g of NMP and 6.00 g of BCS were added, followed by mixing at 25° C. for 8 hours to obtain a liquid crystal aligning agent (A-1). The liquid crystal aligning agent was confirmed to be a uniform solution without any abnormalities such as turbidity and precipitation.

EXAMPLE 2

10.00 g of the 12 mass % polyimide solution (PI-1) obtained in Preparation Example 3 was weighed in a 100 ml Erlenmeyer flask, and 6.02 g of NMP and 4.00 g of BCS were added, followed by mixing at 25° C. for 8 hours to obtain a liquid crystal aligning agent (A-2). The liquid crystal aligning agent was confirmed to be a uniform solution without any abnormalities such as turbidity and precipitation.

EXAMPLE 3

15.00 g of the 12 mass % polyamic acid solution (PAA-2) obtained in Preparation Example 4 was weighed in a 100 ml Erlenmeyer flask, and 9.00 g of NMP and 6.00 g of BCS were added, followed by mixing at 25° C. for 8 hours to obtain a liquid crystal aligning agent (A-3). The liquid crystal aligning agent was confirmed to be a uniform solution without any abnormalities such as turbidity and precipitation.

EXAMPLE 4

15.00 g of the 12 mass % polyamic acid solution (PAA-3) obtained in Preparation Example 5 was weighed in a 100 ml Erlenmeyer flask, and 9.00 g of NMP and 6.00 g of BCS were added, followed by mixing at 25° C. for 8 hours to obtain a liquid crystal aligning agent (A-4). The liquid crystal aligning agent was confirmed to be a uniform solution without any abnormalities such as turbidity and precipitation.

EXAMPLE 5

10.00 g of the polyimide solution (PI-2) obtained in Preparation Example 6 was weighed in a 1 ml Erlenmeyer flask, and 6.00 g of NMP and 4.00 g of BCS were added, followed by mixing at 25° C. for 8 hours to obtain a liquid crystal aligning agent (A-5). The liquid crystal aligning agent was confirmed to be a uniform solution without any abnormalities such as turbidity and precipitation.

EXAMPLE 6

10.00 g of the polyimide solution (PI-3) obtained in Preparation Example 7 was weighed in a 100 ml Erlenmeyer flask, and 6.00 g of NMP and 4.00 g of BCS were added, followed by mixing at 25° C. for 8 hours to obtain a liquid crystal aligning agent (A-6). The liquid crystal aligning agent was confirmed to be a uniform solution without any abnormalities such as turbidity and precipitation.

EXAMPLE 7

10.00 g of the polyimide solution (PI-4) obtained in Preparation Example 8 was weighed in a 100 ml Erlenmeyer flask, and 6.00 g of NMP and 4.00 g of BCS were added, followed by mixing at 25° C. for 8 hours to obtain a liquid crystal aligning agent (A-7). The liquid crystal aligning agent was confirmed to be a uniform solution without any abnormalities such as turbidity and precipitation.

EXAMPLE 8

Into a 100 mL sample tube in which a stirrer was put, 22.00 g of the polyamic acid solution (PAA-7) obtained in Preparation Example 9 and 14.67 g of the polyimide solution (PI-1) obtained in Preparation Example 3 were weighed, and 27.33 g of NMP and 16.00 g of BCS were added, followed by stirring by a magnetic stirrer for 2 hours to obtain a liquid crystal aligning agent (A-8).

EXAMPLE 9

Into a 100 mL sample tube in which a stirrer was put, 22.00 g of the polyamic acid solution (PAA-8) obtained in Preparation Example 10 and 14.65 g of the polyimide solution (PI-1) obtained in Preparation Example 3 were weighed, and 27.36 g of NMP and 16.00 g of BCS were added, followed by stirring by a magnetic stirrer for 2 hours to obtain a liquid crystal aligning agent (A-9).

COMPARATIVE EXAMPLE 1

18.00 g of the 10 mass % polyamic acid solution (PAA-9) obtained in Preparation Example 11 was weighed in a 100 ml Erlenmeyer flask, and 6.00 g of NMP and 6.00 g of BCS were added, followed by mixing at 25° C. for 8 hours to obtain a liquid crystal aligning agent (B-1). The liquid crystal aligning agent was confirmed to be a uniform solution without any abnormalities such as turbidity and precipitation.

COMPARATIVE EXAMPLE 2

15.00 g of the 12 mass % polyamic acid solution (PAA-10) obtained in Preparation Example 12 was weighed in a 100 ml Erlenmeyer flask, and 9.00 g of NMP and 6.00 g of BCS were added, followed by mixing at 25° C. for 8 hours to obtain a liquid crystal aligning agent (B-2). The liquid crystal aligning agent was confirmed to be a uniform solution without any abnormalities such as turbidity and precipitation.

COMPARATIVE EXAMPLE 3

15.00 g of the 12 mass % polyamic acid solution (PAA-11) obtained in Preparation Example 13 was weighed in a 100 ml Erlenmeyer flask, and 9.00 g of NMP and 6.00 g of BCS were added, followed by mixing at 25° C. for 8 hours to obtain a liquid crystal aligning agent (B-3). The liquid crystal aligning agent was confirmed to be a uniform solution without any abnormalities such as turbidity and precipitation.

EXAMPLE 10

The liquid crystal aligning agent (A-1) obtained in Example 1 was subjected to filtration through a filter with a pore size of 1.0 μm, and applied to a rectangular ITO substrate of 30 mm×40 mm×1.1 mm in thickness by spin coating and dried on a hot plate at 80° C. for 2 minutes, followed by baking by a circulating hot air oven at 230° C. for 14 minutes to obtain a coating film having a thickness of 100 nm. The coating film surface was irradiated with ultraviolet rays having a wavelength of 254 nm linearly polarized with an extinction ratio of 26:1 with an amount of irradiation of 200 mJ/cm$^2$ via a polarizing plate. The substrate was dipped in pure water for 3 minutes and heated on a hot plate at 230° C. for 14 minutes to obtain a substrate provided with a liquid crystal alignment film.

Two sheets of such substrates were prepared, bead spacers (manufactured by JGC Catalysts and Chemicals Ltd., SHIN-SHIKYU SW-D14.0) having a particle size of 4 μm were applied to the liquid crystal alignment film surface of one of the substrates, and a sealing agent (manufactured by Kyoritsu Chemical & Co., Ltd., XN-1500T) was dropped on a position of 5 mm from the edge of the substrate short side. On that occasion, the amount of the sealing agent was adjusted so that the diameter of the sealing agent after bonding would be 3 mm. Then, the other substrate was bonded so that the liquid crystal alignment film surfaces faced inside and that the overlap width of the substrates would be 1 cm. The bonded two substrates were fixed with a clip, followed by heat curing at 150° C. for 1 hour to prepare a sample for evaluation of adhesion. As a result of evaluation of seal adhesion, the strength at the time of peeling was 12.7 N.

Further, using two substrates provided with a liquid crystal alignment film prepared in the same manner as the above sample for evaluation of seal adhesion, spacers (manufactured by JGC Catalysts and Chemicals Ltd., SHIN-SHIKYU SW-D14.0) having a particle size of 4 μm were applied to the liquid crystal alignment film surface of one of the substrates, and a sealing agent (manufactured by Kyoritsu Chemical & Co., Ltd., XN-1500T) was printed. Then, the other substrate was bonded so that the liquid crystal alignment film surfaces faced each other and the alignment directions would be 0°, and the sealing agent was cured to prepare an empty cell. To the empty cell, liquid crystal MLC-2041 (manufactured by Merck) was vacuum-injected, and the injection inlet was sealed to obtain a liquid crystal cell.

The alignment state of the liquid crystal in the obtained liquid crystal cell was confirmed and as a result, the alignment state was favorable without alignment defects.

EXAMPLE 11

A sample for evaluation of adhesion was prepared in the same manner as in Example 10 except that after irradiation with polarized ultraviolet rays, the substrate was dipped in a mixed solution of pure water/2-propanol=1/1 for 3 minutes and then dipped in pure water for one minute, instead of dipping in pure water for 3 minutes. As a result of evaluation of seal adhesion, the strength at the time of peeling was 13.2 N.

Further, in the same manner as in Example 10, a liquid crystal cell was prepared and the alignment state of the liquid crystal in the liquid crystal cell was confirmed, and as a result, the alignment state was favorable without alignment defects.

EXAMPLE 12

A sample for evaluation of adhesion was prepared in the same manner as in Example 1 except that the liquid crystal aligning agent (A-2) obtained in Example 2 was used instead of the liquid crystal aligning agent (A-1) obtained in Example 1. As a result of evaluation of seal adhesion, the strength at the time of peeling was 11.0 N.

Further, in the same manner as in Example 10, a liquid crystal cell was prepared and the alignment state of the liquid crystal in the liquid crystal cell was confirmed, and as a result, the alignment state was favorable without alignment defects.

Example 13

A sample for evaluation of adhesion was prepared in the same manner as in Example 10 except that the liquid crystal aligning agent (A-2) obtained in Example 2 was used instead of the liquid crystal aligning agent (A-1) obtained in Example 1 and that after irradiation with polarized ultraviolet rays, the substrate was dipped in a mixed solution of pure water:2-propanol=1/1 for 3 minutes and then dipped in pure water for one minute instead of dipping in pure water for 3 minutes. As a result of evaluation of seal adhesion, the strength at the time of peeling was 11.0 N.

Further, in the same manner as in Example 10, a liquid crystal cell was prepared, and the alignment state of the liquid crystal in the liquid crystal cell was confirmed, and as a result, the alignment state was favorable without alignment defects.

EXAMPLE 14

The liquid crystal aligning agent (A-1) obtained in Example 1 was subjected to filtration through a filter having a pore size of 1.0 applied on a rectangular ITO substrate of 30 mm×40 mm×0.1 mm in thickness by spin coating and dried on a hot plate at 80° C. for 2 minutes, followed by baking by a circulating hot air oven at 230° C. for 14 minutes to form a coating film having a thickness of 100 nm. The coating film surface was subjected to rubbing treatment by means of a rayon cloth by a rubbing apparatus having a roll diameter of 120 mm under conditions of a roll rotational speed of 300 rpm, a roll advancing speed of 20 mm/sec and a pushing amount of 0.1 mm, and the substrate was dipped in pure water for one minute and subjected to ultrasonic cleaning, and dried by a circulating hot air oven at 80° C. to obtain a substrate provided with a liquid crystal alignment film.

Using two sheets of such substrates, a sample for evaluation of adhesion was prepared in the same manner as in Example 10. As a result of evaluation of seal adhesion, the strength at the time of peeling was 13.1 N.

Further, in the same manner as in Example 10, a liquid crystal cell was prepared, and the alignment state of the liquid crystal in the liquid crystal cell was confirmed, and as a result, the alignment state was favorable without alignment defects.

EXAMPLE 15

A sample for evaluation of adhesion was prepared in the same manner as in Example 10 except that the liquid crystal aligning agent (A-3) obtained in Example 3 was used instead of the liquid crystal aligning agent (A-1) obtained in Example 1. As a result of evaluation of seal adhesion, the strength at the time of peeling was 25.8 N.

Further, in the same manner as in Example 10, a liquid crystal cell was prepared and the alignment state of the liquid crystal in the liquid crystal cell was confirmed, and as a result, the alignment state was favorable without alignment defects.

EXAMPLE 16

A sample for evaluation of adhesion was prepared in the same manner as in Example 10 except that the liquid crystal aligning agent (A-4) obtained in Example 4 was used instead of the liquid crystal aligning agent (A-1) obtained in Example 1. As a result of evaluation of seal adhesion, the strength at the time of peeling was 17.8 N.

Further, in the same manner as in Example 10, a liquid crystal cell was prepared and the alignment state of the liquid crystal in the liquid crystal cell was confirmed, and as a result, the alignment state was favorable without alignment defects.

EXAMPLE 17

A sample for evaluation of adhesion was prepared in the same manner as in Example 10 except that the liquid crystal aligning agent (A-5) obtained in Example 5 was used instead of the liquid crystal aligning agent (A-1) obtained in Example 1. As a result of evaluation of seal adhesion, the strength at the time of peeling was 10.2 N.

Further, in the same manner as in Example 10, a liquid crystal cell was prepared and the alignment state of the liquid crystal in the liquid crystal cell was confirmed, and as a result, the alignment state was favorable without alignment defects.

EXAMPLE 18

A sample for evaluation of adhesion was prepared in the same manner as in Example 10 except that the liquid crystal aligning agent (A-5) obtained in Example 5 was used instead of the liquid crystal aligning agent (A-1) obtained in Example 1 and that after irradiation with polarized ultraviolet rays, the substrate was dipped in a mixed solution of pure water:2-propanol=1/1 for 3 minutes and then dipped in pure water for one minute instead of dipping in pure water for 3 minutes. As a result of evaluation of seal adhesion, the strength at the time of peeling was 10.3 N.

Further, in the same manner as in Example 10, a liquid crystal cell was prepared, and the alignment state of the liquid crystal in the liquid crystal cell was confirmed, and as a result, the alignment state was favorable without alignment defects.

EXAMPLE 19

A sample for evaluation of adhesion was prepared in the same manner as in Example 10 except that the liquid crystal aligning agent (A-6) obtained in Example 6 was used instead of the liquid crystal aligning agent (A-1) obtained in Example 1. As a result of evaluation of seal adhesion, the strength at the time of peeling was 15.1 N.

Further, in the same manner as in Example 10, a liquid crystal cell was prepared and the alignment state of the liquid crystal in the liquid crystal cell was confirmed, and as a result, the alignment state was favorable without alignment defects.

EXAMPLE 20

A sample for evaluation of adhesion was prepared in the same manner as in Example 10 except that the liquid crystal aligning agent (A-6) obtained in Example 6 was used instead of the liquid crystal aligning agent (A-1) obtained in Example 1 and that after irradiation with polarized ultraviolet rays, the substrate was dipped in a mixed solution of pure water:2-propanol=1/1 for 3 minutes and then dipped in pure water for one minute instead of dipping in pure water for 3 minutes. As a result of evaluation of seal adhesion, the strength at the time of peeling was 15.4 N.

Further, in the same manner as in Example 10, a liquid crystal cell was prepared, and the alignment state of the liquid crystal in the liquid crystal cell was confirmed, and as a result, the alignment state was favorable without alignment defects.

EXAMPLE 21

A sample for evaluation of adhesion was prepared in the same manner as in Example 10 except that the liquid crystal aligning agent (A-7) obtained in Example 7 was used instead of the liquid crystal aligning agent (A-1) obtained in Example 1. As a result of evaluation of seal adhesion, the strength at the time of peeling was 12.9 N.

Further, in the same manner as in Example 10, a liquid crystal cell was prepared and the alignment state of the liquid crystal in the liquid crystal cell was confirmed, and as a result, the alignment state was favorable without alignment defects.

EXAMPLE 22

A sample for evaluation of adhesion was prepared in the same manner as in Example 10 except that the liquid crystal aligning agent (A-7) obtained in Example 7 was used instead of the liquid crystal aligning agent (A-1) obtained in Example 1 and that after irradiation with polarized ultraviolet rays, the substrate was dipped in a mixed solution of pure water:2-propanol=1/1 for 3 minutes and then dipped in pure water for one minute instead of dipping in pure water for 3 minutes. As a result of evaluation of seal adhesion, the strength at the time of peeling was 13.1 N.

Further, in the same manner as in Example 10, a liquid crystal cell was prepared, and the alignment state of the liquid crystal in the liquid crystal cell was confirmed, and as a result, the alignment state was favorable without alignment defects.

EXAMPLE 23

A sample for evaluation of adhesion was prepared in the same manner as in Example 10 except that the liquid crystal aligning agent (A-8) obtained in Example 8 was used instead of the liquid crystal aligning agent (A-1) obtained in Example 1. As a result of evaluation of seal adhesion, the strength at the time of peeling was 25.2 N.

Further, in the same manner as in Example 10, a liquid crystal cell was prepared and the alignment state of the liquid crystal in the liquid crystal cell was confirmed, and as a result, the alignment state was favorable without alignment defects.

EXAMPLE 24

A sample for evaluation of adhesion was prepared in the same manner as in Example 10 except that the liquid crystal aligning agent (A-9) obtained in Example 9 was used instead of the liquid crystal aligning agent (A-1) obtained in Example 1. As a result of evaluation of seal adhesion, the strength at the time of peeling was 20.0 N.

Further, in the same manner as in Example 10, a liquid crystal cell was prepared and the alignment state of the liquid crystal in the liquid crystal cell was confirmed, and as a result, the alignment state was favorable without alignment defects.

COMPARATIVE EXAMPLE 4

A sample for evaluation of adhesion was prepared in the same manner as in Example 10 except that the liquid crystal aligning agent (B-1) obtained in Comparative Example 1 was used. As a result of evaluation of seal adhesion, the strength at the time of peeling was 3.7 N.

COMPARATIVE EXAMPLE 5

A sample for evaluation of adhesion was prepared in the same manner as in Example 10 except that the liquid crystal aligning agent (B-2) obtained in Comparative Example 2 was used. As a result of evaluation of seal adhesion, the strength at the time of peeling was 8.0 N.

COMPARATIVE EXAMPLE 6

A sample for evaluation of adhesion was prepared in the same manner as in Example 10 except that the liquid crystal aligning agent (B-3) obtained in Comparative Example 3 was used. As a result of evaluation of seal adhesion, the strength at the time of peeling was 7.3 N.

COMPARATIVE EXAMPLE 7

A sample for evaluation of adhesion was prepared in the same manner as in Example 10 except that the liquid crystal aligning agent (B-1) obtained in Comparative Example 1 was used. As a result of evaluation of seal adhesion, the strength at the time of peeling was 4.0 N.

TABLE 1

|  | Liquid crystal aligning agent | Seal adhesion [N] |
|---|---|---|
| Example 10 | Liquid crystal aligning agent (A-1) | 12.7 |
| Example 11 | Liquid crystal aligning agent (A-1) | 13.2 |
| Example 12 | Liquid crystal aligning agent (A-2) | 11.0 |
| Example 13 | Liquid crystal aligning agent (A-2) | 11.0 |
| Example 14 | Liquid crystal aligning agent (A-1) | 13.1 |
| Example 15 | Liquid crystal aligning agent (A-3) | 25.8 |
| Example 16 | Liquid crystal aligning agent (A-4) | 17.8 |
| Example 17 | Liquid crystal aligning agent (A-5) | 10.2 |
| Example 18 | Liquid crystal aligning agent (A-5) | 10.3 |
| Example 19 | Liquid crystal aligning agent (A-6) | 15.1 |
| Example 20 | Liquid crystal aligning agent (A-6) | 15.4 |
| Example 21 | Liquid crystal aligning agent (A-7) | 12.9 |
| Example 22 | Liquid crystal aligning agent (A-7) | 13.1 |
| Example 23 | Liquid crystal aligning agent (A-8) | 25.2 |
| Example 24 | Liquid crystal aligning agent (A-9) | 20.0 |
| Comparative Example 4 | Liquid crystal aligning agent (B-1) | 3.7 |
| Comparative Example 5 | Liquid crystal aligning agent (B-2) | 8.0 |
| Comparative Example 6 | Liquid crystal aligning agent (B-3) | 7.3 |
| Comparative Example 7 | Liquid crystal aligning agent (B-1) | 4.0 |

INDUSTRIAL APPLICABILITY

The liquid crystal alignment film obtained from the liquid crystal aligning agent of the present invention is useful for enlarging the effective pixel area of a liquid crystal display device, and is useful for a highly reliable liquid crystal display device excellent in the display quality.

The entire disclosure of Japanese Patent Application No. 2013-220593 filed on Oct. 23, 2013 including specification, claims and summary is incorporated herein by reference in its entirety.

The invention claimed is:

1. A liquid crystal aligning agent comprising at least one polymer selected from the group consisting of a polyimide precursor having a bond represented by the following formula (1) in its main chain and an imidized polymer of the polyimide precursor:

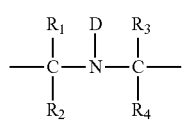

(1)

wherein each of $R_1$, $R_2$, $R_3$ and $R_4$ which are independent of one another, is a hydrogen atom or a $C_{1-20}$ monovalent hydrocarbon group which may have a substituent, and D is a protecting group to be replaced with a hydrogen atom by heat.

2. The liquid crystal aligning agent according to claim 1, wherein the polyimide precursor is a polymer having structural units represented by the following formula (2):

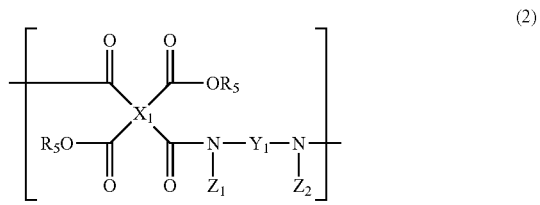

(2)

wherein $X_1$ is a tetravalent organic group, $Y_1$ is a bivalent organic group having a bond represented by the formula (1), $R_5$ is a hydrogen atom or a $C_{1-5}$ alkyl group, and each of $Z_1$ and $Z_2$ which are independent of each other, is a hydrogen atom, or a $C_{1-10}$ alkyl group, $C_{2-10}$ alkenyl group or $C_{2-10}$ alkynyl group which may have a substituent.

3. The liquid crystal aligning agent according to claim 2, wherein the polyimide precursor has the structural units represented by the above formula (2) in an amount of from 20 to 100 mol % based on all the structural units.

4. The liquid crystal aligning agent according to claim 1, wherein D in the bond represented by the formula (1) is a tert-butoxycarbonyl group or a 9-fluorenylmethoxycarbonyl group.

5. The liquid crystal aligning agent according to claim 2, wherein $Y_1$ in the structural units of the above formula (2) is represented by the following formula (3):

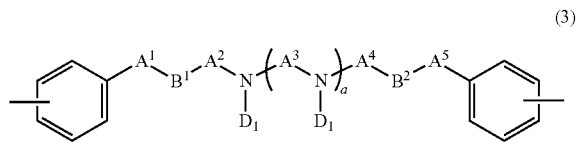

(3)

wherein each of $A^1$ and $A^5$ which are independent of each other, is a single bond or a $C_{1-5}$ alkylene group, each of $A^2$ and $A^4$ which are independent of each other, is a $C_{1-5}$ alkylene group, $A^3$ is a $C_{1-6}$ alkylene group or a cycloalkylene group, each of $B^1$ and $B^2$ which are independent of each other, is a single bond, —O—, —NH—, —NMe-, —C(=O)—, —C(=O)O—, —C(=O)NH—, —C(=O)NMe-, —OC(=O)—, —NHC(=O)— or —N(Me)C(=O)—, $D_1$ is a tert-butoxycarbonyl group or a 9-fluorenylmethoxycarbonyl group, and a is 0 or 1.

6. The liquid crystal aligning agent according to claim 5, wherein $Y_1$ in the structural units of the above formula (2) is represented by the following formula (4):

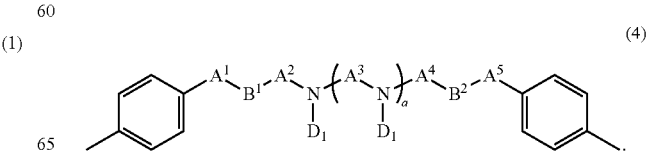

(4)

7. The liquid crystal aligning agent according to claim 5, wherein $D_1$ in the formula (3) is a tert-butoxycarbonyl group.

8. The liquid crystal aligning agent according to claim 2, wherein $Y_1$ in the above formula (2) is at least one bivalent organic group selected from the group consisting of groups of the following formulae (1-1) to (1-4):

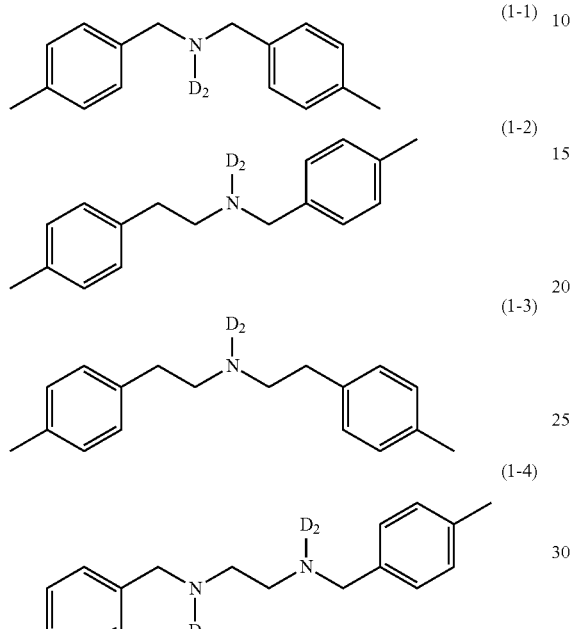

wherein $D_2$ is a tert-butoxycarbonyl group.

9. The liquid crystal aligning agent according to claim 8, wherein $Y_1$ in the above formula (2) is a bivalent organic group represented by the formula (1-2).

10. The liquid crystal aligning agent according to claim 2, wherein $X_1$ in the above formula (2) is at least one member selected from the group consisting of structures represented by the following formulae:

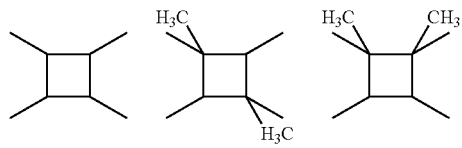

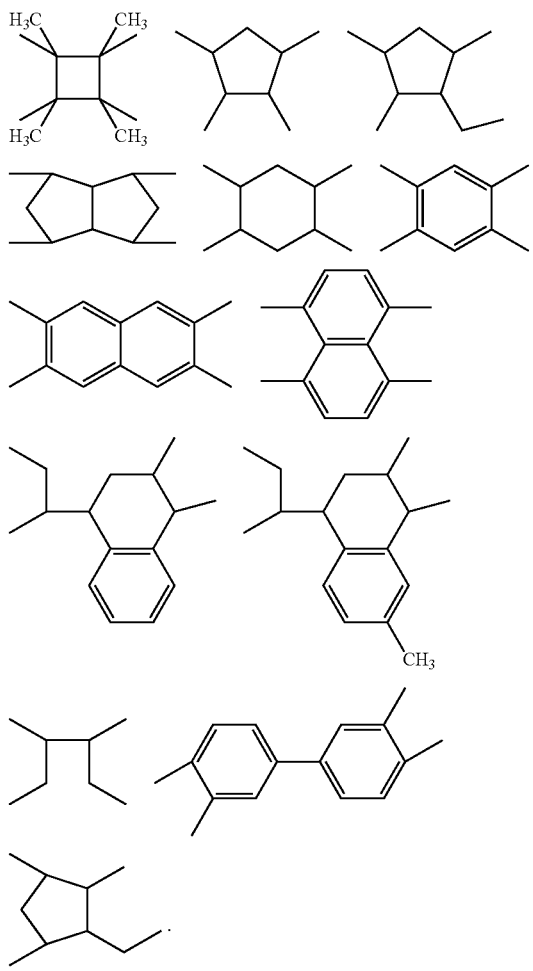

11. A liquid crystal alignment film, obtained by applying and baking the liquid crystal aligning agent according to claim 1.

12. A liquid crystal alignment film obtained by applying the liquid crystal aligning agent according to claim 1, baking it and irradiating it with polarized ultraviolet rays.

13. A liquid crystal display device, comprising the liquid crystal alignment film according to claim 11.

* * * * *